United States Patent
Miller et al.

(10) Patent No.: US 12,380,304 B2
(45) Date of Patent: Aug. 5, 2025

(54) ITEM TRACKING USING RADIO FREQUENCY IDENTIFICATION FILTERING

(71) Applicant: QUALCOMM Incorporated, San Diego, CA (US)

(72) Inventors: Arthur Miller, La Mesa, CA (US); Jeffery Mark Torrance, Stanford, CA (US); Nicolas Graube, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 18/480,987

(22) Filed: Oct. 4, 2023

(65) Prior Publication Data
US 2025/0117612 A1 Apr. 10, 2025

(51) Int. Cl.
*G06K 17/00* (2006.01)
(52) U.S. Cl.
CPC ......... *G06K 17/0029* (2013.01); *G06K 17/00* (2013.01)
(58) Field of Classification Search
CPC .......... G08B 1/08; G08B 13/14; G08B 13/24; G08B 13/2462; G06K 19/00; G06K 19/06; G06K 19/07; G06K 19/077; G06K 17/00; G06N 20/00; G06Q 20/20; G06Q 10/08; G06Q 10/087; G01S 5/00; G01S 5/02; G01S 13/00; G01S 13/04; G01S 13/878; H04W 4/00; H04W 4/029; H04W 4/80
See application file for complete search history.

(56) References Cited

U.S. PATENT DOCUMENTS

| | | | |
|---|---|---|---|
| 11,727,224 B1 | 8/2023 | Maricic | |
| 2010/0188211 A1* | 7/2010 | Brommer | G06K 19/0675 340/539.32 |
| 2010/0201520 A1* | 8/2010 | Stern | G01S 13/878 340/572.1 |
| 2014/0062700 A1* | 3/2014 | Heine | G06Q 10/087 340/572.1 |
| 2018/0247092 A1 | 8/2018 | Khojastepour et al. | |
| 2020/0242580 A1 | 7/2020 | Imamura et al. | |
| 2025/0028913 A1* | 1/2025 | Ryg | G06K 7/0008 |

OTHER PUBLICATIONS

International Search Report and Written Opinion—PCT/US2024/046505—ISA/EPO—Dec. 9, 2024.

* cited by examiner

*Primary Examiner* — Van T Trieu
(74) *Attorney, Agent, or Firm* — Polsinelli

(57) ABSTRACT

Systems and techniques are provided for wireless communications. A Radio Frequency Identification (RFID) observation can be obtained based on an energizing signal and a plurality of backscatter signals from a plurality of RFID tags. Each backscatter signal can indicate an identifier of a respective RFID tag uniquely associated with a particular item of a plurality of items. Expected background noise information, indicative of a subset of the plurality of items for the RFID observation, can be determined based on comparing a location of a wireless communication device and item placement information for the plurality of items. The RFID observation can be filtered using the expected background noise information to exclude information associated with the subset of the plurality of items. A basket content estimation can be determined from the filtered RFID observation, wherein the basket content estimation is indicative of one or more collected items of the plurality of items.

30 Claims, 7 Drawing Sheets

ITEM TRACKING USING RADIO FREQUENCY IDENTIFICATION FILTERING

FIELD OF THE DISCLOSURE

The present disclosure generally relates to wireless communications. For example, aspects of the present disclosure relate to item and/or inventory tracking based on radio frequency identification (RFID) tag information.

BACKGROUND

Short range wireless communication enables wireless communication over relatively short distances (e.g., within thirty meters). For example, Radio Frequency Identification (RFID) systems can be used to perform short range wireless communication based on the wireless transfer of data between a reader (e.g., RFID reader device) and a tag or transponder (e.g., RFID tag). RFID systems can be used for identification, tracking, data storage, etc. For example, RFID systems can be used to identify and/or track various items, such as consumer products.

An RFID tag may be attached to an item to be tracked and may include data storage and an antenna. The data storage stores information corresponding to the associated item, such as a product name, a serial number, product information, a manufacturer, etc. The antenna enables the RFID tag to be read by an RFID reader, which transmits an interrogating signal to one or more RFID tags within communication range. RFID tags can be passive, active, or semi-active. Passive RFID tags utilize the interrogating signal from an RFID reader to power a transmission by or from the RFID tag. Active and semi-active RFID tags can include a power source or battery, which can be used to power a transmission by or from the RFID tag.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, a method for wireless communications is provided, the method comprising: obtaining a Radio Frequency Identification (RFID) observation corresponding to a plurality of backscatter signals from a plurality of RFID tags and based on an energizing signal, wherein each backscatter signal of the plurality of backscatter signals is indicative of an identifier of a respective RFID tag uniquely associated with a particular item of a plurality of items; determining expected background noise information corresponding to the RFID observation, wherein the expected background noise information is indicative of a subset of the plurality of items based on a comparison between a location of a wireless communication device and item placement information for the plurality of items; filtering the RFID observation based on the expected background noise information, wherein a filtered RFID observation does not include information associated with the subset of the plurality of items indicated in the expected background noise information; and determining a basket content estimation based on the filtered RFID observation, wherein the basket content estimation is indicative of one or more collected items of the plurality of items.

In another example, an apparatus for wireless communications is provided. The apparatus includes at least one memory and at least one processor coupled to the at least one memory and configured to: obtain a Radio Frequency Identification (RFID) observation corresponding to a plurality of backscatter signals from a plurality of RFID tags and based on an energizing signal, wherein each backscatter signal of the plurality of backscatter signals is indicative of an identifier of a respective RFID tag uniquely associated with a particular item of a plurality of items; determine expected background noise information corresponding to the RFID observation, wherein the expected background noise information is indicative of a subset of the plurality of items based on a comparison between a location of the apparatus and item placement information for the plurality of items; filter the RFID observation based on the expected background noise information, wherein a filtered RFID observation does not include information associated with the subset of the plurality of items indicated in the expected background noise information; and determine a basket content estimation based on the filtered RFID observation, wherein the basket content estimation is indicative of one or more collected items of the plurality of items.

In another example, a non-transitory computer-readable storage medium is provided that includes instructions that, when executed by at least one processor, cause the at least one processor to: obtain a Radio Frequency Identification (RFID) observation corresponding to a plurality of backscatter signals from a plurality of RFID tags and based on an energizing signal, wherein each backscatter signal of the plurality of backscatter signals is indicative of an identifier of a respective RFID tag uniquely associated with a particular item of a plurality of items; determine expected background noise information corresponding to the RFID observation, wherein the expected background noise information is indicative of a subset of the plurality of items based on a comparison between a location of a wireless communication device and item placement information for the plurality of items; filter the RFID observation based on the expected background noise information, wherein a filtered RFID observation does not include information associated with the subset of the plurality of items indicated in the expected background noise information; and determine a basket content estimation based on the filtered RFID observation, wherein the basket content estimation is indicative of one or more collected items of the plurality of items.

In another example, an apparatus for wireless communications is provided. The apparatus includes: means for obtaining a Radio Frequency Identification (RFID) observation corresponding to a plurality of backscatter signals from a plurality of RFID tags and based on an energizing signal, wherein each backscatter signal of the plurality of backscatter signals is indicative of an identifier of a respective RFID tag uniquely associated with a particular item of a plurality of items; means for determining expected background noise information corresponding to the RFID observation, wherein the expected background noise information is indicative of a subset of the plurality of items based on a comparison between a location of the apparatus and item placement information for the plurality of items; means for filtering the RFID observation based on the expected background noise information, wherein a filtered RFID observation does not include information associated with the subset of the plurality of items indicated in the expected background noise information; and means for determining a basket content estimation based on the filtered RFID observation, wherein the basket content estimation is indicative of one or more collected items of the plurality of items.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
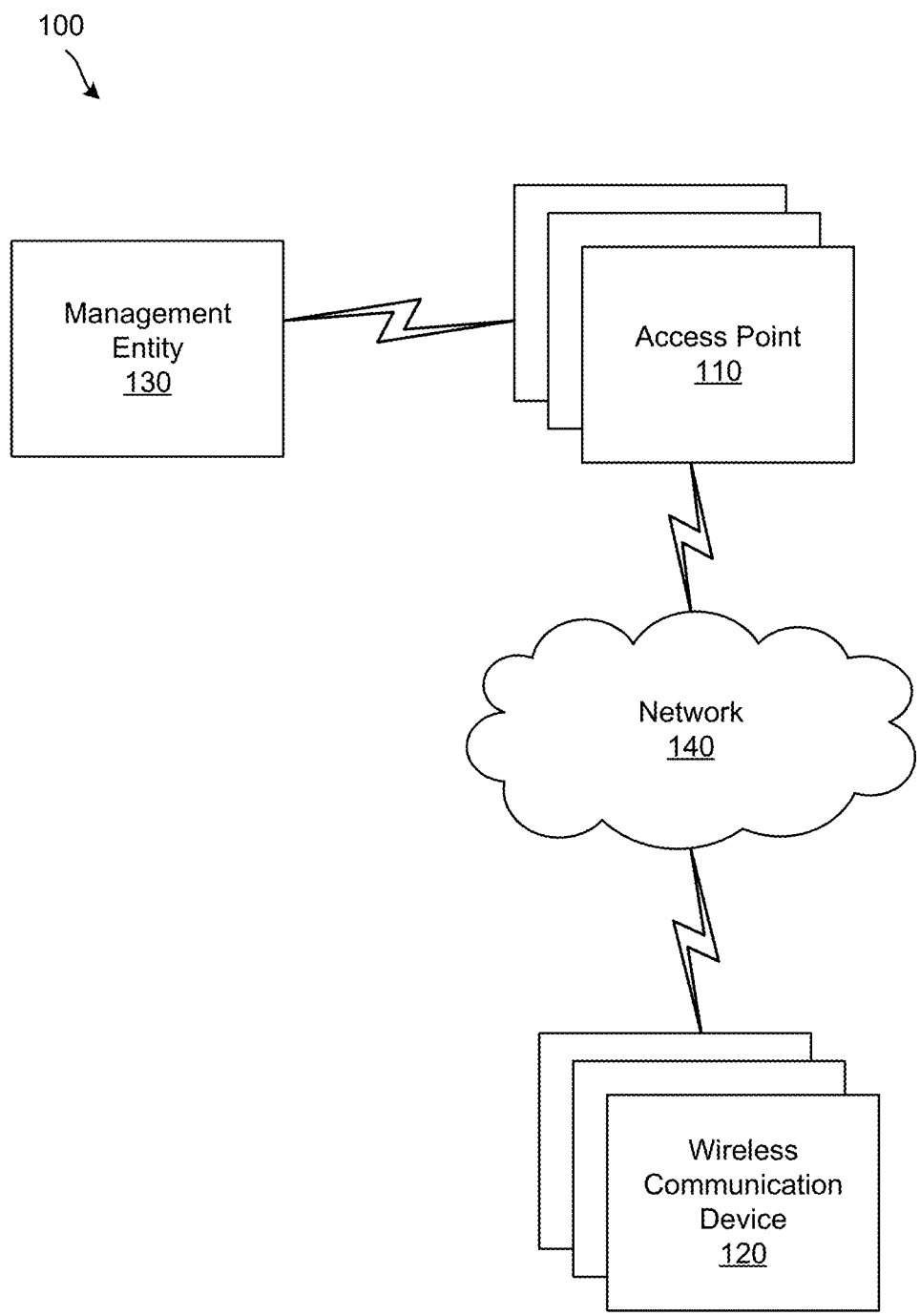
FIG. 1 is a diagram illustrating an example environment in which systems and/or methods described herein may be implemented, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Radio Frequency Identification (RFID) systems can be used for short range wireless communication between a reader device (e.g., RFID reader) and one or more tags or transponders (e.g., RFID tags). An RFID reader may also be referred to as an "RFID interrogator" and/or an "energizer." RFID systems can be used to identify and/or track various items that are associated with one or more RFID tags (e.g., various items to which one or more RFID tags are attached). RFID systems can read and/or write information to and/or from (respectively) RFID tags, based on respective wireless communications between an RFID reader and the RFID tags.

For example, an RFID reader (e.g., energizer) can be used to interrogate one or more RFID tags to obtain information of the nearby items that are within communication range of the RFID reader and the interrogation signal. The RFID reader (e.g., energizer) can transmit a radio frequency (RF) signal to perform the energizing and interrogating of the RFID tags. An RFID tag that receives the interrogating RF wave can respond by transmitting another RF wave. An RFID tag may generate the responsive RF wave originally (e.g., in examples where the RFID tag is an active or semi-active tag). An RFID tag may generate the responsive RF wave passively, for instance by reflecting back a portion of the interrogating RFID wave using a backscatter process (e.g., in examples where the RFID tag is a passive tag).

In some examples (e.g., such as in product-related and/or service-related industries, etc.), RFID systems can be used to track objects that are being processed, inventoried, shipped, handled, etc. For example, an RFID tag can be attached to an individual item (e.g., to the packaging of an individual item, etc.) to provide tracking and identification of the individual item. In some examples, an RFID tag can be attached to a collection or group of individual items (e.g., to a pallet of same or similar items being shipped to a store or distribution center, etc.).

An RFID tag attached to a respective item, or attached to a group of items, may store corresponding information thereof. For example, an RFID tag can include a data storage element that stores information corresponding to the item(s) to which the RFID is attached and associated. For instance, RFID tag information can include one or more of a product name, a serial number, product information, a manufacturer, etc. In some examples, the RFID tag can store identification information that is directly indicative of a tagged item, product, object, etc. For instance, an RFID tag can store identification information such as a unique product serial number, etc. In some examples, the RFID tag does not store product or item identification information directly, and stores a unique RFID tag serial number or identification number which may be externally mapped to various item identification information such as product serial numbers, product names, product SKUs, etc.

An RFID reader (e.g., energizer) can transmit an RF signal configured to cause the RFID tags to transmit at least a portion of their respective identification information. The RFID reader can receive (e.g., scan) the identification information transmitted by the one or more RFID tags energized by the RFID reader, and can use the identification information to determine the tagged items or products that are nearby to the RFID reader.

In some examples, RFID tags can store item identification information that utilizes various granularity levels for tracking and management of the RFID tagged items. For example, RFID tags can be used to track item types or models by using different RFID tags (e.g., unique identifiers) per item type or item model, with RFID identifier reuse across individual tagged items that are of the same type or model. For instance, the RFID tags used for each item of a particular type may store the same product identifier, and can be used to decrement an inventory count for the particular item whenever a tag is scanned and removed from the shelf, from the store, etc.

In another example, RFID tags can be used to track and identify individual items, based on using a corresponding RFID tag and unique identifier for each individual item of a plurality of RFID-tagged items that are registered with the RFID system. In some examples, individual and unique item identifiers can be implemented based on using individual and unique RFID tag serial numbers or identifiers, which may be mapped separately to a corresponding individual item. In some examples, individual and unique item identifiers can be implemented based on using a product type identifier combined with a unique identifier within that product type. For instance, items can be tagged with their corresponding product SKU and a unique identifier of each item within the corresponding product SKU. In some cases, the unique RFID tag identifiers can be mapped in one or more databases to additional information associated with an item, such as manufacturing data, batch number, specific store location, etc.

RFID systems can be used in a retail environment for purposes such as inventory tracking (e.g., determining when items are removed from shelves, which particular items are removed from shelves and the quantity thereof, etc.). RFID systems can also be used in a retail environment for determining the contents of a shopper's basket, for instance based on reading the RFID tags of items as they are placed in the shopper's basket, reading the RFID tags of the items once they are within the shopper's basket, reading the RFID tags of the items during the checkout process or as the final collection of items is removed from the shopper's basket, etc. As used herein, a shopper's "basket" can refer to any receptacle or volume within which items are placed for temporary storage and/or transport prior to purchase. For example, a shopper's "basket" can include various implementations, such as a handheld-basket, a cart or trolley, a bag or satchel, etc. A shopper's "basket" or "basket contents" may also refer to the hand carry of one or more items by a shopper.

RFID readers can be configured to read hundreds of RFID tags per second, based on the respective RFID tags responding to an interrogation signal from the RFID reader using a corresponding time slot determined for the respective RFID tag. The time slot used by an RFID tag may be assigned by the RFID reader, or may be determined by the RFID tags. For example, RFID tags can respond to an interrogation signal based on randomly choosing a time slot within a configured time window for response. In some cases, an anti-collision algorithm can be used to divide a time window into a plurality of discrete time slots for RFID tags responses, within which each RFID tag may randomly choose or be assigned a particular time slot. Each RFID tag transmits its identification information back to the reader in the corresponding or allocated time slot for the RFID tag. Restricting each RFID tag to a particular time slot reduces the changes of a collision occurring when two or more RFID tags attempt to transmit during the same time slot. If a collision occurs, the multiple RFID tags attempting to transmit during the same time slot are not successfully read by the RFID reader, and may be configured to select new time slots and retransmit.

RFID systems may commonly be implemented without the capability to perform selective reporting. Selective reporting can be associated with an RFID reader that reports only information associated with RFID tags of interest, where the RFID tags of interest are a subset within a larger plurality of RFID tag reflections that are read by the RFID reader. For instance, a non-selective RFID reader will report the reflected information read for any RFID tag that is within range to respond to the interrogation signal(s) from the reader. A selective RFID reader can perform selective reporting to filter the reflected information received from a plurality of RFID tags and report only the corresponding information associated with a subset of interest. However, the selective reporting of RFID tag identification information does not suppress RFID tags that are not of interest (e.g., not included in the subset of interest) from responding to the interrogation signal (e.g., the RFID tags not of interest will still respond and consume a time slot). Additionally, in some examples it can be difficult or impossible to determine in advance which RFID tags belong to the subset of interest and which RFID tags do not belong to the subset of interest.

For instance, in use cases such as shopper basket contents determination (e.g., identifying the products placed into a shopper's basket in a store), the primary task for which the RFID system is utilized may be to determine the subset of interest comprising RFID tags of items selected for purchase by the shopper and placed into the basket.

In some cases, an RFID system can utilize one or more RFID readers (e.g., energizers) with antenna configurations that are adjusted to limit the reading range and/or reading zone. For example, an RFID reader can be configured with a reading zone that corresponds to an angular section of an omnidirectional or 360° reading zone. The selective reading of RFID tags based on antenna configurations of an RFID reader can be challenging when the spatial relationship between the RFID reader(s) and the RFID tag(s) is unknown and/or changing. For instance, in a basket content determination example, the relative spatial positions of the RFID reader and the RFID tags in the shopper's basket can vary, and/or the relative spatial positions of the RFID reader and the RFID tags of items on the shelves can vary.

In another example, selective RFID tag reading may be based on spatial isolation between the RFID reader and one or more RFID tags. For example, by spatially isolating an RFID reader from RFID tags that are not of interest (e.g., using an attenuation barrier, increasing physical separation distance, etc.), the RFID reader can be used to read RFID tags of interest that are not spatially isolated. An example of selective RFID tag reading based on spatial isolation is the reading of basket contents at a spatially isolated checkout area within a store or other retail environment, where the checkout process is performed away from the products on the shelves. Selective RFID tag reading based on spatial isolation may limit RFID tag reading to only being performed in particular areas (e.g., at the checkout area, but not within the store aisles) and/or at particular times (e.g., at checkout, but not during shopping).

There is a need for systems and techniques that can be used to perform selective reading of RFID tags without a priori information of selected subset of RFID tags of interest. There is a further need for systems and techniques that can be used to perform selective reading of RFID tags to determine basket contents (e.g., the items placed within a shopper's basket in a store or retail environment) through the recording of collected items' RFID identification information. There is a need for systems and techniques that can be used to perform selective RFID tag reading for basket content determination prior to checkout and/or without using spatial isolation between tags of interest and tags not of interest. For instance, there is a need for selective RFID tag reading to track the evolution of basket contents throughout a user or customer's progression through a store or retail environment, based on distinguishing between the RFID tags of collected items and the RFID tags of on-shelf items and other background noise (e.g., including tracking the evolution of basket contents at one or more periodic time intervals, tracking the basket contents in continuous time, and/or tracking the changes in the basket contents in continuous time, etc.).

Systems, apparatuses, processes (also referred to as methods), and computer-readable media (collectively referred to as "systems and techniques") are described herein that can be used to perform selective reading of RFID tags and RFID tag identification information corresponding to collected items of a shopper's basket (e.g., also referred to as "basket contents"). The systems and techniques can perform selective RFID tag reading without using configuration information that is indicative of a first subset of RFID tags that are of interest and/or that is indicative of a second subset of RFID tags that are not of interest. The systems and techniques can be used to obtain RFID tag identification information corresponding to a shopper's basket contents based on a time series and/or location-based analysis of RFID tag identification information obtained from a plurality of RFID tags attached to products in a store or retail environment. In some aspects, selective reading of RFID tags can be implemented without using modified antenna configurations for RFID readers (e.g., energizers) used to interrogate and scan the RFID tags. For instance, the systems and techniques can be used to determine a shopper's basket contents without narrowing or confining the energizing of RFID tags to the physical confines or limits of the shopper's basket.

In one illustrative example, the systems and techniques can use a time series and/or location-based analysis of multiple RFID tag scans (e.g., multiple occasions or records of RFID tag identification information obtained in response to an energizing or interrogation signal from an RFID reader) to filter out what may be referred to as "background noise." For instance, the filtered background noise can comprise RFID tag identification information of items on nearby shelves (e.g., not included in the basket contents) that were within range to be energized and scanned by an RFID reader.

In some aspects, selective RFID tag reading can be performed based on measuring the respective signal strength of reply transmissions received by an RFID reader from nearby RFID tags (e.g., the nearby RFID tags receiving an energizing or interrogation signal from the RFID reader). In one illustrative example, the systems and techniques can be configured to determine a respective Received Signal Strength Indicator (RSSI) value for each reflected signal received from an RFID tag (e.g., passive RFID tag) in response to an energizing signal used by the RFID reader to interrogate and scan nearby tags. For instance, based on a placement of the RFID reader (e.g., energizer) on, within, or nearby to the shopper's basket, one or more signal strength thresholds can be used to filter the RFID tag identification information of the basket contents from the background noise of unwanted RFID tags corresponding to items on the shelves or otherwise not within the shopper's basket contents. In some cases, the RFID reader (e.g., energizer) can be integrated with the basket, can be configured as a smartphone or UE (e.g., of the shopper), etc. Based on determining that the RSSI of the reflected signal from a respective RFID tag is greater than a configured (e.g., pre-determined) threshold, the item corresponding to the identification information of the respective RFID tag can be included in the basket contents.

In another illustrative example, time series data can be stored for a plurality of measurement occasions, where each measurement occasion corresponds to at least one energizing signal transmitted by an RFID reader to interrogate and scan for nearby RFID tags. The time series data of RFID tag scans can be used to populate a time series table and/or data structure (e.g., database of or associated with the RFID reader, etc.), and can be analyzed to determine an estimated or most likely basket contents. For instance, the systems and techniques can be used to determine a number of times that a respective table entry (e.g., a respective RFID tag identification information) has been observed, and a final determination of the basket contents can be based on a frequency analysis of the number of occurrences per respective RFID tag identification information within the table. For example, an item placed within a shopper's basket will likely be scanned multiple times by the RFID reader (e.g., energizer), while an item belonging to the background noise may be scanned a lesser number of times.

In some aspects, the time series data (e.g., information of the table) can include a record of the number of observations for a particular RFID tag identifier, a last observed time, a first observed time, time gaps between observations, signal strength variations (e.g., RSSI variations), etc. The final estimate or determination of the basket contents can be determined based on the time analysis of the records stored within the table, with RFID tag identifiers observed due to background noise presenting as transient in nature and filtered out (e.g., removed from the estimated basket contents) accordingly.

In another illustrative example, the systems and techniques can be configured to correlate one or more (or all) of the RFID observations obtained corresponding to one or more energizing occasions of an RFID reader with location information of the RFID reader at the time of the energizing occasion. For instance, the time series data (e.g., RFID scan information stored in the table) can be augmented with corresponding location information of the RFID reader at the time of the energizing occasion (e.g., the location of the RFID reader when the energizing and tag scanning was performed). In some aspects, the location information of the RFID reader can be a location within a store or retail environment. In some examples, the location information of the RFID reader can be relative location information, such as a position of the RFID reader within a particular aisle of a plurality of aisles of the store or retail environment. In some examples, the location information of the RFID reader at the time of an energizing occasion can be determined using one or more location systems and/or location-determination techniques that are independent from RFID. For example, location information of the RFID reader can be determined relative to or with respect to item inventory within a store, without using reflected RFID tag information from the item inventory associated with the relative localization.

In some aspects, the location information of the RFID reader can be correlated with map and/or product distribution information corresponding to the store or retail environment within which the RFID reader is located. For instance, the RFID reader location information can be correlated with a store planogram or other schematic, diagram, or model indicative of the placement of retail products on shelves, aisles, etc. In some cases, the RFID reader location information can be correlated with a store real-o-gram, indicative of an approximately real-time reporting of the particular products on particular shelves, within particular aisles, etc.

In some aspects, the location information of the RFID reader at the time of an energizing occasion may be determined using one or more location systems and/or location-determination techniques that utilize at least a portion of the RFID tag reflections received by the RFID reader. For instance, a proximity-based location determination technique can be implemented based on analyzing the plurality of RFID tag reflections received by the RFID reader, as the majority of the RFID reflection will come from the environment (e.g., item inventory) surrounding the RFID reader. In some cases, an expected RFID signature can be determined based on analyzing item inventory and location mapping information, such as a plan-o-gram or real-o-gram that maps item inventory locations to corresponding RFID tag identifiers. In some aspects, knowledge of an expected signature determined based on analyzing the item inventory location information can be used to determine a coarse location estimate for the RFID reader. The expected RFID signature may be the same as or similar to an RF-fingerprint generated without performing physical surveying through measurements (e.g., the expected RFID signature can be the same as or similar to an RF-fingerprint inferred from and/or determined using the item inventory information, such as a real-o-gram or plan-o-gram). In some aspects, the expected RFID signature information and/or the reflected RFID signals used for proximity-based location determination can be used to adjust a plan-o-gram (e.g., indicative of intended item locations on the shelves) to a real-o-gram (e.g., indicative of actual and/or real-time observed item locations on the shelves). In some examples, proximity-based location information is determined from the same background noise (e.g., RFID reflections from tags attached to items not within the basket contents) that is to be filtered out or eliminated during the basket contents determination process.

Based on the location information of the RFID reader at the time of an energizing signal (e.g., interrogation signal to scan nearby RFID tags), the systems and techniques can determine one or more expected items within the surrounding vicinity of the RFID reader. For instance, the location information can be compared to the store planogram to determine one or more expected items (e.g., and corresponding RFID tag identifiers thereof) within the scanning range (e.g., read range or read zone) of the RFID reader. The expected items determined from the location information of the RFID reader and store planogram can be used to determine a listing of expected background noise RFID tag scans or readings, which may be filtered from the actual RFID tag scans or readings obtained by the RFID reader (e.g., energizer) in response to the energizing signal used to interrogate and scan for nearby tags. Based on removing the RFID tag identification information of the expected background noise from the reading(s) obtained by the RFID reader, RFID observations of interest (e.g., corresponding to a basket contents estimate) can be derived. In some examples, the expected items of the background noise can be used to determine items within the basket contents based on comparing the current location of the RFID reader to the product or item location information of the store planogram. RFID tags that are observed in a location different from and/or inconsistent with their expected placement as indicated by the store planogram can be identified as likely belonging to the basket contents.

Further aspects of the systems and techniques will be described with reference to the figures.

FIG. 1 is a diagram of an example environment 100 in which systems and/or methods described herein may be implemented. As shown in FIG. 1, the environment 100 may include at least one access point (AP) 110, at least one wireless communication device 120, a management entity (ME) 130, and a network 140. Devices of the environment 100 may interconnect via wired connections, wireless connections, or a combination of wired and wireless connections.

The access point 110 may include one or more devices capable receiving, generating, storing, processing, providing, and/or routing information associated with access point synchronization and/or handover, as described elsewhere herein. The access point 110 may include a communication device and/or a computing device. The access point 110 may be configured to transmit beacons (e.g., BLE beacons), as well as to scan and locate other devices (e.g., other devices communicating using BLE protocols).

The wireless communication device 120 may include one or more devices capable of receiving, generating, storing, processing, and/or providing information associated with access point synchronization and/or handover, as described elsewhere herein. The wireless communication device 120 may include a communication device and/or a computing device. In some aspects, the wireless communication device 120 may be, may include, or may be included in an electronic shelf label (ESL).

The management entity 130 includes one or more devices capable of receiving, generating, storing, processing, providing, and/or routing information associated with access point synchronization and/or handover, as described elsewhere herein. The management entity 130 may include a communication device and/or a computing device. For example, the management entity 130 may include a server, such as an application server, a client server, a web server, a database server, a host server, a proxy server, a virtual server (e.g., executing on computing hardware), or a server in a cloud computing system. In some aspects, the management entity 130 includes computing hardware used in a cloud computing environment. The management entity 130 may provide control of a system (e.g., an ESL system) that includes the access point(s) 110, the wireless communication device(s) 120, and/or other device(s). The access point (s) 110 may be communicatively connected to the management entity 130 via a network (not shown), such as the Internet.

The network 140 may include one or more wireless networks. For example, the network 140 may include a personal area network (e.g., a Bluetooth network). The network 140 enables communication among the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
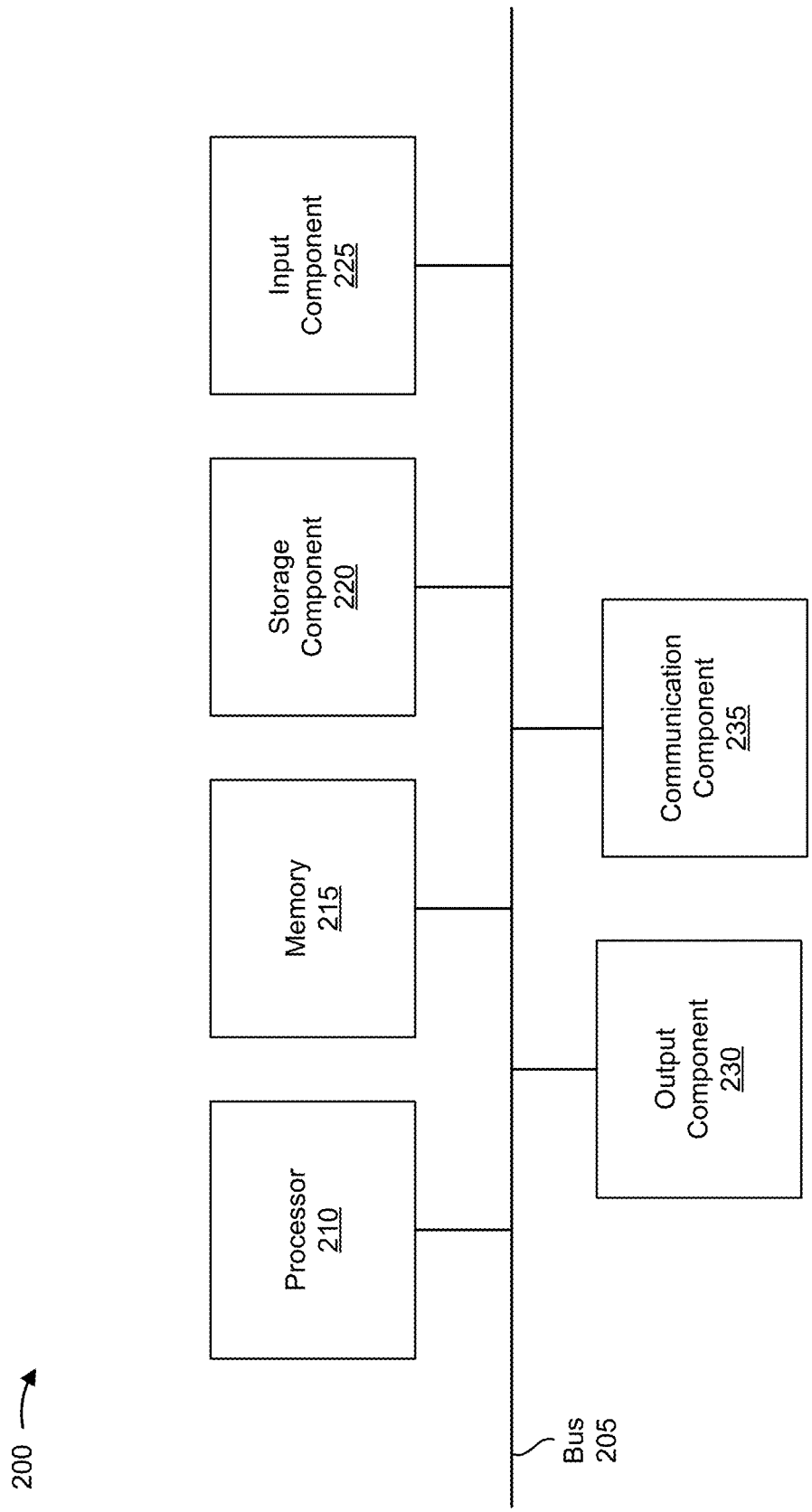
FIG. 2 is a diagram illustrating example components of a device, in accordance with some examples.

FIG. 2 is a diagram illustrating example components of a device 200, in accordance with the present disclosure. Device 200 may correspond to access point 110, wireless communication device 120, and/or management entity 130. In some aspects, access point 110, wireless communication device 120, and/or management entity 130 may include one or more devices 200 and/or one or more components of device 200. As shown in FIG. 2, device 200 may include a bus 205, a processor 210, a memory 215, a storage component 220, an input component 225, an output component 230, and/or a communication component 235.

Bus 205 may include a component that permits communication among the components of device 200. Processor 210 may be implemented in hardware, firmware, or a combination of hardware and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 may include one or more processors capable of being programmed to perform a function. Memory 215 may include a random access memory (RAM), a read only memory (ROM), and/or another type of dynamic or static storage device (e.g., a flash memory, a magnetic memory, and/or an optical memory) that stores information and/or instructions for use by processor 210.

Storage component 220 can store information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 may include a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 can include a component that provides output information from device 200 (e.g., a display, a speaker, a haptic feedback component, and/or an audio or visual indicator).

Communication component 235 may include one or more transceiver-like components (e.g., a transceiver and/or a separate receiver and transmitter) that enables device 200 to communicate with other devices, such as via a wired connection, a wireless connection, or a combination of wired and wireless connections. Communication component 235 may permit device 200 to receive information from another device and/or provide information to another device. For example, communication component 235 may include an Ethernet interface, an optical interface, a coaxial interface, an infrared interface, a radio frequency interface, a universal serial bus (USB) interface, a wireless local area interface (e.g., a Wi-Fi interface or a BLE interface), and/or a cellular network interface.

Communication component 235 may include one or more antennas for receiving wireless radio frequency (RF) signals transmitted from one or more other devices, cloud networks, and/or the like. The antenna may be a single antenna or an antenna array (e.g., antenna phased array) that can facilitate simultaneous transmit and receive functionality. The antenna may be an omnidirectional antenna such that signals can be received from and transmitted in all directions. The wireless signals may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network.

The one or more transceiver-like components (e.g., a wireless transceiver) of the communication component 235 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals into a baseband or intermediate frequency and can convert the RF signals to the digital domain.

In some cases, a CODEC may be implemented (e.g., by the processor 210) to encode and/or decode data transmitted and/or received using the one or more wireless transceivers. In some cases, encryption-decryption may be implemented (e.g., by the processor 210) to encrypt and/or decrypt data (e.g., according to the Advanced Encryption Standard (AES) and/or Data Encryption Standard (DES) standard) transmitted and/or received by the one or more wireless transceivers.

In some aspects, device 200 may represent an ESL. The ESL may include a battery in addition to the aforementioned components. In some aspects, the output component 230 of the ESL may be an electronic paper (e-paper) display or a liquid crystal display (LCD).

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication component 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
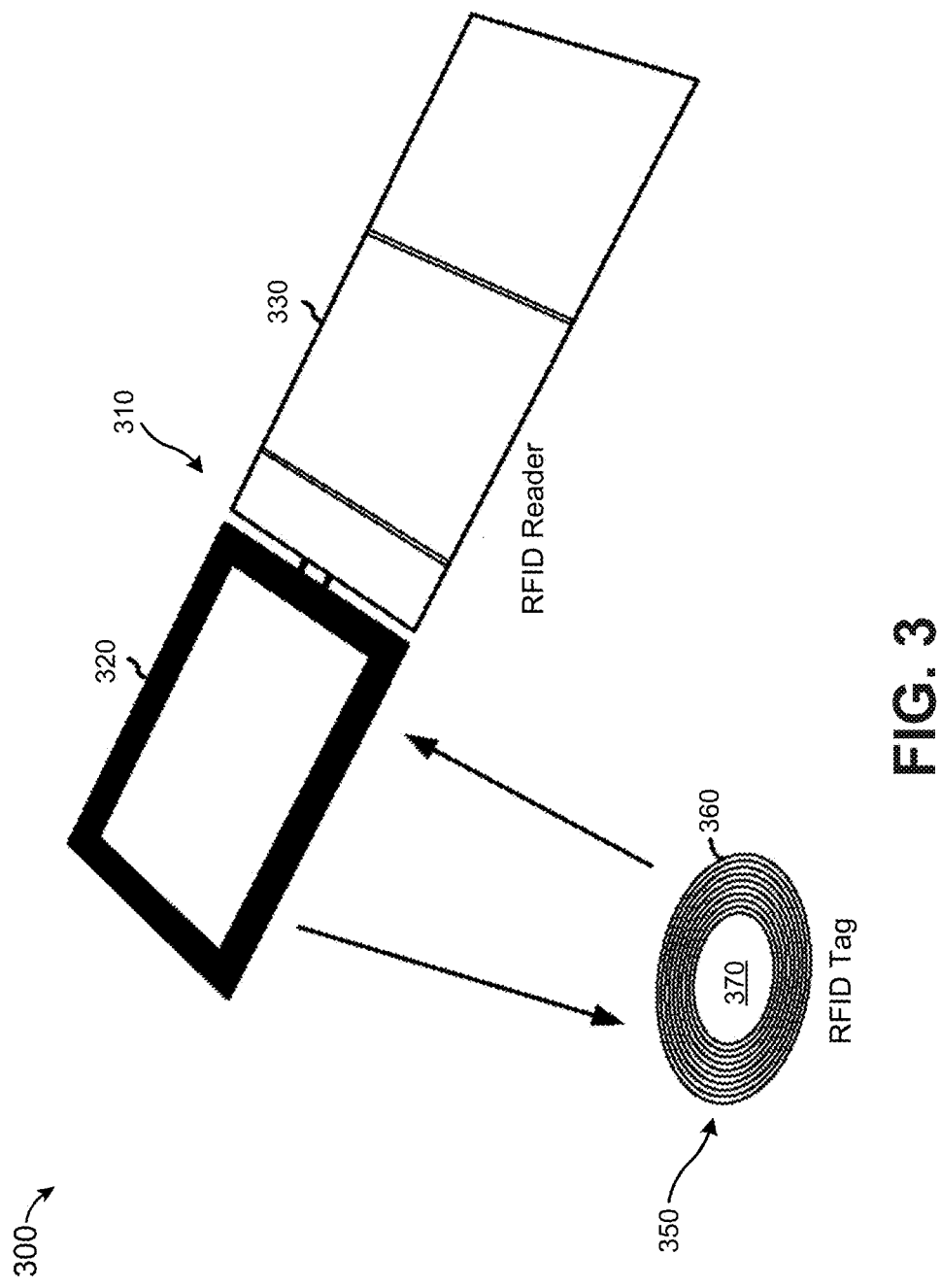
FIG. 3 is a diagram illustrating an example of an RFID system, in accordance with some examples.

FIG. 3 is a diagram illustrating an example RFID system 300 that includes an RFID reader (e.g., energizer) 310 and an RFID tag 350. RFID reader 310 may also be referred to as an interrogator, a scanner, an energizer, etc. RFID tag 350 may also be referred to as an RFID label, an electronics label, etc.

RFID reader 310 includes an antenna 320 and an electronics unit 330. Antenna 320 radiates signals transmitted by RFID reader 310 and receives signals from RFID tags (e.g., such as the RFID tag 350) and/or other devices. Electronics unit 330 may include a transmitter and a receiver for reading RFID tags such as RFID tag 350. The same pair of transmitter and receiver (or another pair of transmitter and receiver) may support bi-directional communication with wireless networks, wireless devices, etc. In some examples, a first RFID reader or RFID device can include a transmitter for energizing one or more RFID tags, and a second RFID reader or RFID device can include a receiver for receiving the reflected signals from the one or more RFID tags. For instance, an RFID reader can be configured to implement energizing and tag reading capabilities (e.g., includes a transmitter and a receiver), can be configured to implement energizing capabilities (e.g., includes a transmitter), and/or can be configured to implement tag reading capabilities (e.g., includes a receiver). The electronics unit 330 may include processing circuitry (e.g., a processor) to perform processing for data being transmitted and received by RFID reader 310.

RFID tag 350 includes an antenna 360 and a data storage element 370. Antenna 360 radiates signals transmitted by RFID tag 350 and receives signals from RFID reader 310 and/or other devices. For instance, RFID tags can be passive, active, or semi-active. Passive RFID tags utilize the interrogating signal from an RFID reader to power a transmission by or from the RFID tag. Active and semi-active RFID tags can include a power source or battery, which can be used to power a transmission by or from the RFID tag. In some examples, the RFID tag 350 may be a passive RFID tag having no battery. In this case, a magnetic field from a signal transmitted by RFID reader 310 (e.g., an energizing or interrogating signal from the RFID reader 310) may induce an electrical current in RFID tag 350, which may then operate based on the induced current. RFID tag 350 can radiate its signal in response to receiving a signal from RFID reader 310 or some other device.

The RFID tag 350 can use the data storage element 370 to store identification information corresponding to the RFID tag 350 and/or corresponding to an item associated with the RFID tag 350 (e.g., an item to which the RFID tag 350 is attached, etc.). For example, data storage element 370 can be used to store identification information using various granularity levels for tracking and management of an RFID tagged item. An RFID tag attached to a respective item, or attached to a group of items, may store corresponding information thereof. For example, the RFID tag 350 can be configured to store, using data storage element 370, identification information corresponding to the item(s) to which the RFID tag 350 is attached and associated. For instance, RFID tag information can include one or more of a product name, a serial number, product information, a manufacturer, etc. In some examples, the RFID tag 350 can store (e.g., using the data storage element 370) identification information that is directly indicative of a tagged item, product, object, etc. For instance, the RFID tag 350 can store identification information such as a unique product serial number, etc. In some examples, the RFID tag 350 does not store product or item identification information directly, and stores a unique RFID tag serial number or identification number corresponding to the RFID tag 350, which may be externally mapped to various item identification information such as product serial numbers, product names, product SKUs, etc.

Data storage element 370 can be configured to store identification information for RFID tag 350, e.g., in an electrically erasable programmable read-only memory (EEPROM). RFID tag 350 may also include an electronics unit that can process the received signal and generate the signals to be transmitted.

RFID tag 350 may be read as follows. RFID reader 310 may be placed or moved within close proximity to RFID tag 350. RFID reader 310 may radiate a first signal (which is also called an interrogation signal) via its antenna 320. The energy of the first signal may be coupled from RFID reader antenna 320 to RFID tag antenna 360 via magnetic coupling and/or other phenomena. RFID tag 350 may receive the first signal from RFID reader 310 via antenna 360 and, in response, may radiate a second signal (which is also referred to as a responding signal) comprising the information stored in data storage element 370. RFID reader 310 may receive the second signal from RFID tag 350 via antenna 320 and may process the received signal to obtain the information sent in the second signal.

RFID system 300 may be designed to operate at 33.56 MHz or some other frequency. RFID reader 310 may have a specified maximum transmit power level, which may be imposed by the Federal Communication Commission (FCC) in the United Stated or other regulatory bodies in other countries. The specified maximum transmit power level of RFID reader 310 limits the distance at which RFID tag 350 can be read by RFID reader 310.

As noted previously, the systems and techniques described herein can be used to perform selective reading of RFID tags and RFID tag identification information corresponding to collected items of a shopper's basket (e.g., also referred to as "basket contents"). The systems and techniques can perform selective RFID tag reading without using configuration information that is indicative of a first subset of RFID tags that are of interest and/or that is indicative of a second subset of RFID tags that are not of interest. The systems and techniques can be used to obtain RFID tag identification information corresponding to a shopper's basket contents based on a time series and/or location-based analysis of RFID tag identification information obtained from a plurality of RFID tags attached to products in a store or retail environment. In some aspects, selective reading of RFID tags can be implemented without using modified antenna configurations for RFID readers (e.g., energizers) used to interrogate and scan the RFID tags. For instance, the systems and techniques can be used to determine a shopper's basket contents without narrowing or confining the energizing of RFID tags to the physical confines or limits of the shopper's basket.

Figure 4:
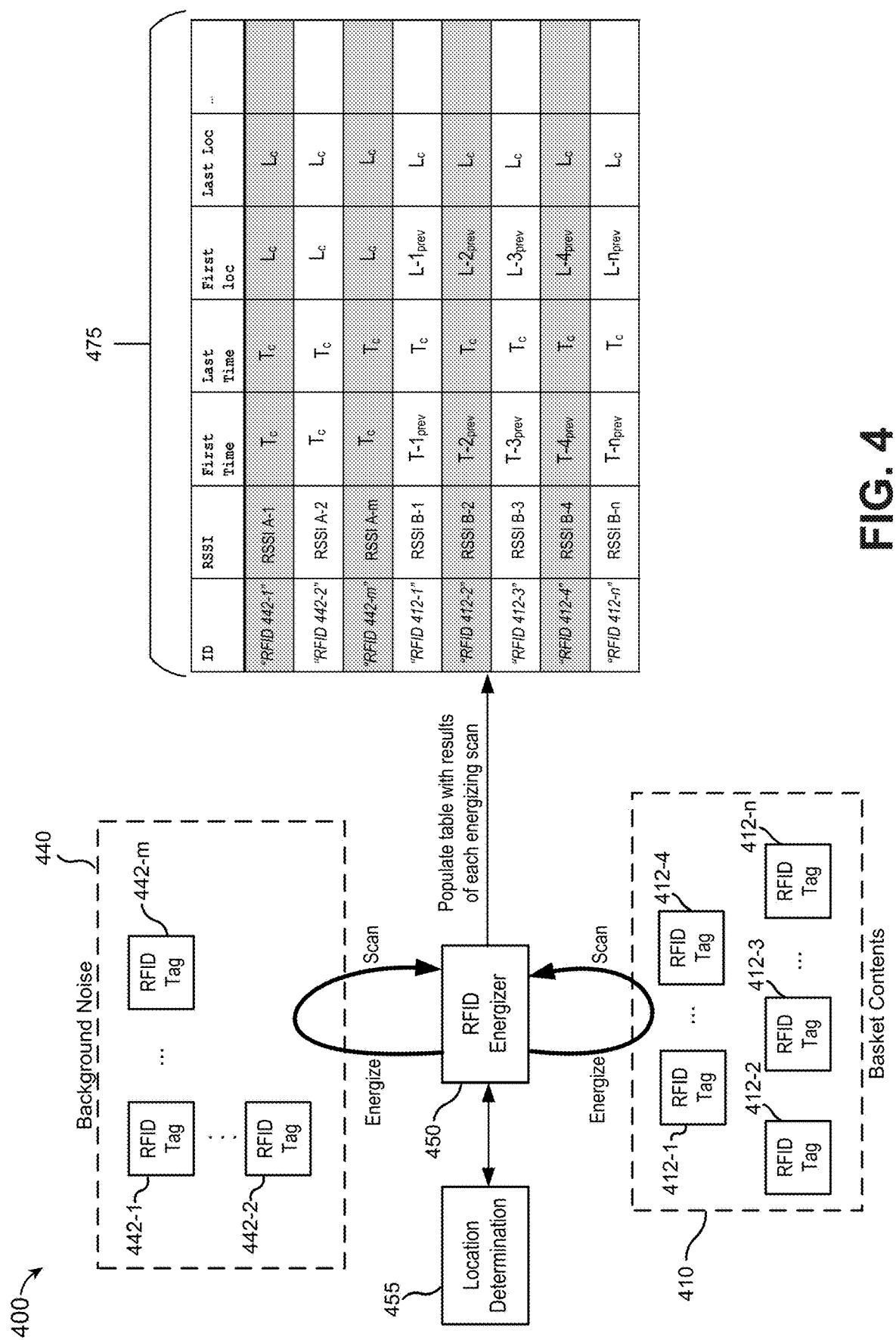
FIG. 4 is a diagram illustrating an example of selective Radio Frequency Identification (RFID) tag reading based on time series information associated with one or more energizing scans of an RFID reader, in accordance with some examples.

For instance, FIG. 4 is a diagram illustrating an example of a selective RFID tag reading system 400 that can be configured to determine collected items (e.g., basket contents) based on obtaining and analyzing time series information associated with one or more energizing scans of an RFID reader, in accordance with some examples. In one illustrative example, the selective RFID tag reading system 400 can include an RFID energizer 450 (e.g., an RFID reader) that is configured to scan for nearby RFID tags based on generating and transmitting one or more energizing signals. In some aspects, the RFID energizer 450 can also be referred to as an RFID reader, and may be the same as or similar to the RFID reader 310 of FIG. 3. In some aspects, the RFID energizer 450 can be configured to generate and transmit an energizing signal at a periodic interval and/or in response to a command or other configuration for generating and transmitting the energizing signal. The energizing signal can be used to interrogate for nearby RFID tags (e.g., RFID tags within a read range and/or read zone of the RFID energizer 450). The energizing signal can also be referred to as an interrogation signal.

The RFID energizer 450 can be associated with a shopper (e.g., user within a store or retail environment) and/or can be associated with the shopper's basket (e.g., a handheld basket, a pushcart, trolley, etc.). For instance, the RFID energizer 450 (or a device including and/or implementing the RFID energizer 450) can be placed on, within, or nearby to the shopper's basket. In some cases, the RFID energizer 450 can be integrated with the basket and/or can be mounted on (e.g., attached to) the basket. In some cases, the RFID energizer 450 can be configured as a smartphone or UE (e.g., of the shopper), etc., and may be located in proximity to the basket based on the smartphone or UE being carried by the shopper and the shopper being located in proximity to the basket. In some cases, a first RFID energizer 450 can be included in or associated with the shopper's basket and a second RFID energizer 450 can be associated with a consumer hand-held device (e.g., a handheld device carried by the shopper, such as a smartphone, UE, etc.).

The RFID energizer 450 can include a transmitter for transmitting an energizing signal (e.g., interrogation signal) and can include a receiver for receiving a reflected signal indicative of identification information of a corresponding RFID tag (e.g., in examples where the corresponding RFID tag is a passive or semi-passive RFID tag that utilizes energy of the interrogation signal transmitted by the RFID energizer 450 to transmit or reflect a backscatter signal indicative of the RFID tag identification information). In some examples, the RFID energizer 450 can include an antenna or receiver for receiving the reflected signals and/or tag identification information from one or more RFID tags, and a transmitter configured to generate the energizing signal (e.g., interrogation signal) can be separate from the RFID energizer 450. For example, an energizer may be located on the shopper's cart or basket, and the RFID energizer 450 (e.g., RFID reader) may be configured as a read-only device integrated in or implemented by the shopper's handheld computing device. In another example, an energizer may be located within the aisles or mounted to the shelving units of a store or retail environment, and can be configured to transmit one or more energizing signals based on a proximity of one or more of the shopper, the shopper's basket, the shopper's RFID reader device, etc.

In one illustrative example, the RFID energizer 450 can be used to energize and read one or more RFID tags within a read range and/or read zone of the RFID energizer 450 and the energizing signal. For example, the RFID energizer 450 can energize and read the one or more RFID tags 442-1, 442-2, . . . , 442-$m$ and/or the one or more RFID tags 412-1, 412-2, 412-3, 412-4, . . . , 412-$n$. In some aspects, some (or all) of the RFID tags 442-1, . . . , 442-$m$ and/or 412-1, . . . , 412-$n$ may be the same as or similar to the RFID tag 350 of FIG. 3. For example, some (or all) of the RFID tags of FIG. 4 can be implemented as passive RFID tags configured to reflect a backscatter signal indicative of the corresponding RFID tag identification information, where the backscatter signal is a reflected signal based on an energizing signal transmitted by the RFID energizer 450.

In some aspects, the RFID tags 442-1, 442-2, . . . , 442-$m$ can be associated with (e.g., attached to) items located on the shelves of a store or retail environment, and the RFID tags 412-1, . . . , 412-$n$ may be associated with (e.g., attached to) items located within the shopper's basket. For instance, the RFID tags 442-1, . . . , 442-$m$ may be included in a background noise 440 subset of RFID tags and the RFID tags 412-1, . . . , 412-$n$ may be included in a basket contents 410 subset of RFID tags. In some cases, the background noise 440 subset of RFID tags may include all RFID tags (e.g., of a plurality of RFID tags within and/or associated with the store or retail environment) that are not included in the basket contents 410 subset of RFID tags.

RFID tags (e.g., such as the RFID tags 442-1, . . . , 442-$m$ and/or the RFID tags 412-1, . . . , 412-$n$) may be attached to corresponding items, products, objects, etc., within a store or other retail environment. In some aspects, the RFID tags may be attached to items, products, objects, etc., that are moveable. In some examples, the RFID tags may be attached to items, products, objects, etc., that are fixed and/or non-moveable. For instance, one or more RFID tags can be attached to fixed anchors such as structural columns, walls, shelving units, etc., within a store or other retail environment. The fixed objects and attached RFID tags can be used as fixed anchors for proximity-based location determination techniques, which in some aspects can be used for the location determination 455. In some cases, RFID tags may be attached to fixed anchors that are permanently immovable (e.g., support columns, walls, etc.). RFID tags may also be attached to fixed anchors that may be movable over longer periods of times but are not movable on a transient or short-term basis (e.g., shelving units may be moved during a store remodel, but are not transiently movable by shoppers, and as such an attached RFID tag can be associated to a known location for proximity-based location determination techniques). The RFID tags may be applied at the time of manufacture of the items, during shipping or transportation of the items, at the time of stocking the items on the shelves of the store or retail environment, etc. Each RFID tag can be uniquely registered or mapped to an individual product or item within the store or retail environment. For instance, a mapping can be maintained between unique RFID tag identifiers and a corresponding product to which each RFID tag is affixed. In some examples, the RFID tag data storage element (e.g., such as data storage element 370 of FIG. 3) can be used to store unique identification information of a corresponding product to which the RFID tag is attached.

In some examples, the RFID energizer 450 is configured to perform one or more energizing scans to interrogate and read nearby RFID tags. For instance, using the RFID energizer 450 to perform an energizing scan can include transmitting an energizing signal to one or more (or all) of the RFID tags 442-1, . . . , 442-m of the background noise 440 subset of RFID tags and transmitting an energizing signal to one or more (or all) of the RFID tags 412-1, . . . , 412-n of the basket contents subset 410 of RFID tags. In one illustrative example, the "energize" signal shown in FIG. 4 between the RFID energizer 450 and background noise 440 subset of RFID tags can be the same as the "energize" signal shown in FIG. 4 between the RFID energizer 450 and basket contents subset 410 of RFID tags. For instance, the RFID energizer 450 may transmit a single, omnidirectional energizing signal for a configured duration during the energizing scan, and both the RFID tags of the background noise 440 and the RFID tags in the basket contents 410 can receive (and backscatter) the same energizing signal from the RFID energizer 450.

As noted previously, the systems and techniques described herein can be used to perform selective reading of RFID tags that are interrogated (e.g., energized and scanned) during a same energizing scan occasion and/or using the same energizing signal. For instance, the systems and techniques can perform selective reading of the respective RFID tag identification information corresponding to the basket contents 410 RFID tags (e.g., RFID tags 412-1, . . . , 412-n) while filtering out respective RFID tag identification information corresponding to the RFID tags of the background noise 440. Based on the selective reading of the RFID tags of the basket contents 410, the systems and techniques can accurately identify a shopper's basket contents and determine the shopper's collected items. Based on determining the basket contents 410 identification information in real-time and/or as the basket moves throughout the store or retail environment, the systems and techniques can be used to provide diffused point-of-sale transactions, where the shopper may check out and purchase the collected items of their basket contents 410 without being required to visit a pre-defined checkout location and/or checkout infrastructure. For instance, the shopper's determined basket contents 410 can be charged to payment information stored on file for the shopper based on determining that the shopper has left the store with the collected items of the basket contents 410.

In some cases, the basket contents 410 can be determined over time, using a plurality of energizing scans performed by the RFID energizer 450 at different points in time (e.g., with different points in time corresponding to different basket contents 410 and different background noise 440 from nearby RFID tags of shelved items, etc.). In some cases, an RFID energizing scan performed by the RFID energizer 450 may result in a successful RFID tag read for only a portion of the RFID tags that are within range to be interrogated and read during the RFID energizing scan. For instance, if two RFID tags attempt to transmit their respective identification information during the same time slot, the transmissions collide and are not received by the RFID energizer 450. For example, if RFID tag 442-1 and RFID tag 442-2 attempt to transmit respective identification information during the same time slot of the energizing scan of RFID energizer 450, the RFID energizer 450 may not receive the identification information transmission from RFID tag 442-1 or the identification information transmission from RFID tag 442-2/In another example, if the RFID tag 412-1 and the RFID tag 412-3 (e.g., both included in the basket contents 410) attempt to transmit their respective identification information during the same time slot, the RFID energizer 450 will not read either RFID tag 412-1 or RFID tag 412-3 during the energizing scan. In some aspects, performing multiple energizing scans to determine the basket contents 410 and/or to filter out the background noise 440 can improve the accuracy of the final basket contents 410 determination, based on the reduced probability of a particular RFID tag experiencing a collision during each of the energizing scans performed by the RFID energizer 450.

In another example, performing a plurality of energizing scans by the RFID energizer 450 can reduce the occurrence of occlusion or blocking of the signal transmission path between the RFID energizer 450 and respective ones of the basket contents RFID tags 450. For instance, collected items placed in a shopper basket may be stacked or arranged on top of one another, and the signal transmission path between the RFID energizer 450 and a respective RFID tag may be blocked or attenuated based on the presence of various collected items and/or other objects on the signal transmission path. Occlusions and/or the stacking or blocking of RFID tags by other collected items may cause the RFID energizer 450 to miss the read of one or more collected items within the basket contents 410 during a particular energizing scan.

For instance, a top layer of collected items in a shopper's basket may include the corresponding items attached to RFID tag 412-1, RFID tag 412-4, . . . , etc. A bottom layer of collected items in the shopper's basket may include the items attached to RFID tag 412-2, 412-3, . . . , 412-n, . . . , etc. The energizing signal transmitted by RFID energizer 450 during an energizing scan may be blocked (e.g., occluded, attenuated, etc.) from reaching the RFID tag 412-2 on the bottom layer of the basket, by the items on the top layer of the basket (e.g., the items tagged with RFID tag 412-1 and/or RFID tag 412-4). Based on the RFID tag 412-2 not receiving the energizing signal from RFID energizer 450, the RFID tag 412-2 does not backscatter a signal indicative of the identification information of RFID tag 412-2. In some cases, the energizing signal transmitted by the RFID energizer 450 is stronger or more powerful than the backscatter signal reflected by the RFID tags. Occlusions and/or attenuation of backscatter signals from RFID tags may also occur based on the stacking, blocking, etc., of the signal transmission path by other collected items in the shopper's basket.

For instance, the RFID tag 412-2 may receive the energizing signal from RFID energizer 450 and transmit (e.g., reflects) a backscatter signal in response, and the backscatter signal from RFID tag 412-2 may be attenuated, occluded, blocked, etc., by the collected item associated with RFID tag 412-1, etc. A backscatter signal that is transmitted by an RFID tag in the basket contents 410 but is not received by the RFID energizer 450 (e.g., based on the backscatter signal being occluded, attenuated, blocked, etc.) is a missed read of the RFID tag for the corresponding energizing scan. Performing multiple energizing scans of the basket contents 410 and/or surrounding environment of the RFID energizer 450 (e.g., performing multiple energizing scans of the basket contents 410 and surrounding environment background noise 440 from nearby RFID tags) can reduce the probability of a collected item within the basket contents 410 being missed (e.g., not included) in a final estimate or determination of the basket contents 410.

For instance, the probability of a missed read occurring during a respective energizing scan of the plurality of energizing scans may be approximately the same. The probability of a missed read occurring for a collected item RFID tag (e.g., 412-n) during each energizing scan of the plurality of energizing scans decreases as the number of energizing scans performed by the RFID energizer 450 increases. When a missed scan occurs based on an occlusion or blocking of the signal transmission path by other collected items within the shopper's basket, the probability of missed scans may also change over time (e.g., increase or decrease) based on the composition of collected items within the basket changing and/or based on the relative positions of each collected item within the basket changing. For instance, a collected item that is initially occluded by an upper layer of collected items may, over time, shift position within the shopper's basket and move out of the occlusion or blockage of the signal transmission path to the RFID energizer 450.

In one illustrative example, the selective RFID tag reading system 400 of FIG. 4 can be configured to perform an energizing scan and receive a plurality of backscatter signals from a corresponding plurality of RFID tags (e.g., RFID tags 442-1, . . . , 442-m, RFID tags 412-1, . . . , 412-n, etc.) within the vicinity (e.g., read range and/or read zone) of the RFID energizer 450. Each backscatter signal can be indicative of a corresponding identification information of a particular RFID tag. In some aspects, the RFID energizer 450 can determine a respective signal strength of each backscatter signal received as a reply message from an RFID tag (e.g., each backscatter signal received in response to the energizing signal transmitted by the RFID energizer 450 or other RFID energizer).

For example, the RFID energizer 450 can measure and/or determine a respective signal strength for each backscatter signal of a plurality of backscatter signals received in response to the energizing signal from the RFID energizer 450. In one illustrative example, the RFID energizer 450 can determine a respective Received Signal Strength Indicator (RSSI) value for each backscatter signal indicative of RFID tag identification information. In some aspects, the respective backscatter RSSI values can be compared to one or more configured (e.g., pre-determined) thresholds to determine whether the corresponding tag identification information with the respective backscatter RSSI value is associated with an RFID tag belonging to the background noise 440 or an RFID tag belonging to the basket contents 410.

For instance, the backscatter RSSI values associated with RFID tags included in the basket contents subset 410 may be greater than the configured threshold, based on the RFID energizer 450 being positioned at a relatively close or short distance to the basket and the collected items of the basket contents 410. For example, as noted previously, the RFID energizer 450 can be included in or attached to the basket or cart, and/or can be included in a hand-held device (e.g., smartphone, UE, etc.) carried by the shopper or other user associated with the basket or cart. The backscatter RSSI values associated with RFID tags included in the background noise 440 may be less than the configured threshold, for instance based on the RFID energizer 450 being positioned at a relatively far distance from the respective RFID tags 442-1, . . . , 442-m of the background noise 440. For instance, the background noise 440 can include the RFID tagged items located on the shelves of the store or retail environment, located within the baskets or carts of other shoppers in the store or retail environment, etc. In some aspects, the background noise subset 440 includes the RFID tagged items that are not included within the user's basket contents 410, and some (or all) of the background noise RFID tagged items in the background noise 440 may be expected to have a lower RSSI to the RFID energizer 450 than the basket content RFID tagged items 410, based on the position of the RFID energizer 450 on or near the basket housing, etc.

In some aspects, the RFID energizer 450 can determine the RSSI values associated with a plurality of scanned RFID tags during an energizing scan (e.g., where the plurality of scanner RFID tags comprises the RFID tags transmitting a backscatter reflection received by the RFID energizer 450). The determined RSSI values can be used to determine and/or estimate a corresponding proximity for each scanned RFID tag, and the proximity of a scanned RFID tag can be treated as the proximity for the particular item to which the scanned RFID tag is attached and associated (e.g., based on the mapping between the particular item to the identification information of the scanned RFID tag). In some cases, the RSSI values of backscatter signals received by the RFID energizer 450 from scanned RFID tags can be used to determine relative proximity estimates or relative proximity information, such as determining whether an RFID tag is in relatively close proximity to the RFID energizer 450 (e.g., more likely included in the basket contents 410 subset of RFID tags) or is in relatively far proximity to the RFID energizer 450 (e.g., more likely included in the background noise 440 subset of RFID tags). In some examples, the RSSI values of the backscatter signals from RFID tags can be used to determine an absolute proximity estimate or absolute proximity information, such as a distance (e.g., in inches, feet, meters, etc.) between the RFID tag and the RFID energizer 450.

In another illustrative example, the RFID energizer 450 can perform a plurality of energizing scans of nearby RFID tags and can obtain and/or store time series information corresponding to the scanned RFID tags. For instance, the RFID energizer 450 can be associated with time series data 475 maintained and updated for the plurality of energizing scans performed using the RFID energizer 450. In some aspects, the time series data 475 can be implemented as a table, database, data store, tabular data structure, etc., indexable on the RFID tag identification information associated with (e.g., indicated by) the respective backscatter signals transmitted by nearby RFID tags to the RFID energizer 450 during an energizing scan occasion. For instance, the time series data 475 can be a table with one or more entries for each unique RFID tag identification information (e.g., each RFID tag identifier or item identifier) received by the RFID energizer 450 in at least one energizing scan occasion.

In some aspects, the RFID energizer 450 can generate, store, maintain, and/or update the time series data 475 locally. For instance, the RFID energizer 450 can be implemented by a smartphone, UE, handheld user computing device, etc., which can be used to generate, store, maintain, and/or update the time series data 475. In some examples, the RFID energizer 450 can be used to update the information stored in the time series data table 475, where the time series data table 475 is remote from the RFID energizer 450 device. In some combination, the time series data table 475 can be implemented locally by the RFID energizer 450, remotely from the RFID energizer 450, and/or as a combination of the two.

In some aspects, each distinct or unique RFID tag identifier or identification information can be associated with a corresponding row within the data table 475. For instance, each unique item signature read or scanned during an energizing scan of the RFID energizer 450 can correspond to at least one row within the data table 475. Each row can include an indication of the particular identifier or item signature (e.g., the "ID" column of table 475) and one or more additional columns of RFID scan information associated with the particular identifier or item signature.

For instance, a row of the time series data table 475 can include information such as the particular identifier or item signature (e.g., the 'ID' column of table 475) read from an RFID tag, a signal strength or RSSI measured for the RFID tag scan (e.g., the 'RSSI' column of table 475); a first read or scan time when the RFID energizer 450 first received a backscatter signal with the particular identifier or item signature (e.g., the 'First Time' column of table 475); a last or most recent scan time when the RFID energizer 450 most recently received a backscatter signal with the particular identifier or item signature (e.g., the 'Last Time' column of table 475); a first location (e.g., of the RFID energizer 450, of the basket, etc.) where the RFID energizer 450 received a backscatter signal with the particular identifier or item signature (e.g., the 'First Loc' column of table 475); a last or most recent location (e.g., of the RFID energizer 450, of the basket, etc.) where the RFID energizer 450 received a backscatter signal with the particular identifier or item signature (e.g., the 'Last Loc' column of table 475); etc.

For instance, the value 'RSSI A-1' can be a measured RSSI value determined for the backscatter signal received by RFID energizer 450 from the RFID tag 442-1. The measured RSSI value can be a most recently measured RSSI value, corresponding to the 'last time' $T_c$ (e.g., the current time associated with the energizing signal transmitted in the current measurement occasion or energizing scan occasion of the RFID energizer 450). In some aspects, the RFID energizer 450 may determine that the RFID identifier or other identification information included in a backscatter signal received from an RFID tag (e.g., RFID tag 442-1) is not included or represented in the table 475. The RFID energizer 450 can create a new entry (e.g., new row) in the table 475 for a newly seen RFID identifier, such as the 'RFID 442-1' identifier corresponding to RFID tag 442-1. For a newly added RFID identifier entry in the table 475, the 'first time' and the 'last time' of observation (e.g., reading the RFID tag) can be the same, and may both be set equal to the current time $T_c$. In some examples, the RFID energizer 450 can determine its current location or position within the store or retail environment, for instance based on location information received from a location determination engine 455. In some examples, the location determination engine 455 can be included in the same device used to implement the RFID energizer 450. In some cases, the location determination engine 455 can be external or separate from the RFID energizer 450, for instance implemented as an external device (e.g., to RFID energizer 450) that is located within the store or retail location. In one illustrative example, the location determination engine 455 of FIG. 4 can be the same as or similar to one or more of the location system 510 and/or the location agent 515 of FIG. 5.

In the example of a newly added RFID identifier entry in the table 475 (e.g., such as any of 'RFID 442-1' corresponding to RFID tag 442-1, 'RFID 442-2' corresponding to RFID tag 442-2, ..., and/or 'RFID 442-m' corresponding to RFID tag 442-m), the location information determined by the location determination engine 455 for the RFID energizer 450 at the time of the energizing signal and/or current energizing scan can be stored in associated with the RFID identifier entry. For instance, a currently determined location, $L_c$, can be stored as both the 'first loc' and the 'last loc' for the newly added RFID identifier entries in the table 475.

In some cases, one or more of the RFID tags 412-1, ..., 412-n may be associated with existing entries in the time series data 475, for instance based on the RFID tags 412-1, ..., 412-n being associated with (e.g., tagged to) collected items within the shopper's basket, which may have been present and scanned in one or more previous energizing scan occasions performed by the RFID energizer 450. In some aspects, existing entries within the table 475 can be updated with information corresponding to a most recent or currently read identification information for the respective RFID tag. For example, the existing identifier 'RFID 412-1' within the table 475 can correspond to the RFID tag 412-1, and can include a 'first time' scan value indicative of some earlier time (e.g., $T\text{-}1_{prev}$) at which the RFID energizer 450 first scanned the RFID tag 412-1 identification information (e.g., the identifier 'RFID 412-1'). The 'last time' field for RFID tag 412-1 can be updated to the current energizing scan time $T_c$. The table 475 can additionally include a 'first loc' field indicative of a location (e.g., $L\text{-}1_{prev}$) where the RFID tag 412-1 was scanned at the previous time $T\text{-}1_{prev}$.

In some aspects, each RFID tag that is read by the RFID energizer 450 in the current energizing scan (e.g., each RFID tag for which the RFID energizer 450 receives a corresponding backscatter signal indicative of the respective RFID identification information of the RFID tag) can be updated or written to the table 475 with measurement information that includes the current time $T_c$ in the 'last time' field. For instance, if each RFID tag of FIG. 4 is read by the RFID energizer 450 in the current energizing scan of time $T_c$, the table 475 can be updated to store the current time $T_c$ as the 'last time' of measurement for each of the RFID tags of FIG. 4. In some cases, each RFID tag that is read by the RFID energizer 450 at the same time and/or energizing scan occasion can be associated, in table 475, with the same measurement location information (e.g., $L_c$). For instance, each RFID tag measured at the current time $T_c$ can be associated to the measurement location $L_c$ for the current energizing scan occasion.

In some aspects, the RFID energizer 450 and/or the time series data 475 can be configured to store information indicative of a number of times that a respective RFID identifier has been observed (e.g., scanned or read) by the RFID energizer 450. For instance, the table 475 can include a column for a counter value for each respective one of the RFID tag identifiers, where the counter value is incremented upon each observation of the RFID tag identifier during a particular energizing scan occasion performed by the RFID energizer 450.

In one illustration example, the time series data 475 can be stored by the RFID energizer 450 for a plurality of measurement occasions (e.g., energizing scans), where each measurement occasion corresponds to at least one energizing signal transmitted by the RFID energizer 450 to interrogate and scan for nearby RFID tags that may belong to either the background noise 440 or the basket contents 410. The time series data of RFID tag scans 475 can be used to populate a time series table and/or data structure (e.g., database of or associated with the RFID energizer 450, etc.), and can be analyzed to determine an estimated or most likely basket contents 410. For instance, the systems and techniques can be used to determine a number of times that a respective table entry (e.g., a respective RFID tag identification information) has been observed, and a final determination of the basket contents 410 can be based on a frequency analysis of the number of occurrences per respective RFID tag identification information within the table 475. For example, an item placed within a shopper's basket will likely be scanned multiple times by the RFID energizer 450, while an item belonging to the background noise may be scanned a lesser number of times. For example, the item associated with RFID tag 412-$n$ is first scanned at a previous time T-$n_{prev}$, and may be scanned an additional number of times that is less than or equal to the number of energizing scans performed by the RFID energizer 450 subsequent to the previous time T-$n_{prev}$.

The frequency analysis of the observations of RFID tag identifiers over multiple energizing scan occasions can be combined with one or more additional measurement observations represented within the table 475. For instance, in some aspects, the time series data 475 can include a record of the number of observations for a particular RFID tag identifier, a last observed time, a first observed time, time gaps between observations, signal strength variations (e.g., RSSI variations), etc. The final estimate or determination of the basket contents 410 can be determined based on the time analysis of the records stored within the table 475, with RFID tag identifiers observed due to background noise presenting as transient in nature and filtered out (e.g., removed from the estimated basket contents) accordingly. For instance, the RFID tag identifiers associated with RFID tags 442-1, 442-2, . . . , and/or 442-$m$ may be classified or identified as background noise, and may be filtered out of (e.g., removed from) the estimated basket contents 410 based on the measurement information associated with the RFID tags 442-1, . . . , 442-$m$ being transient in nature.

Figure 5:
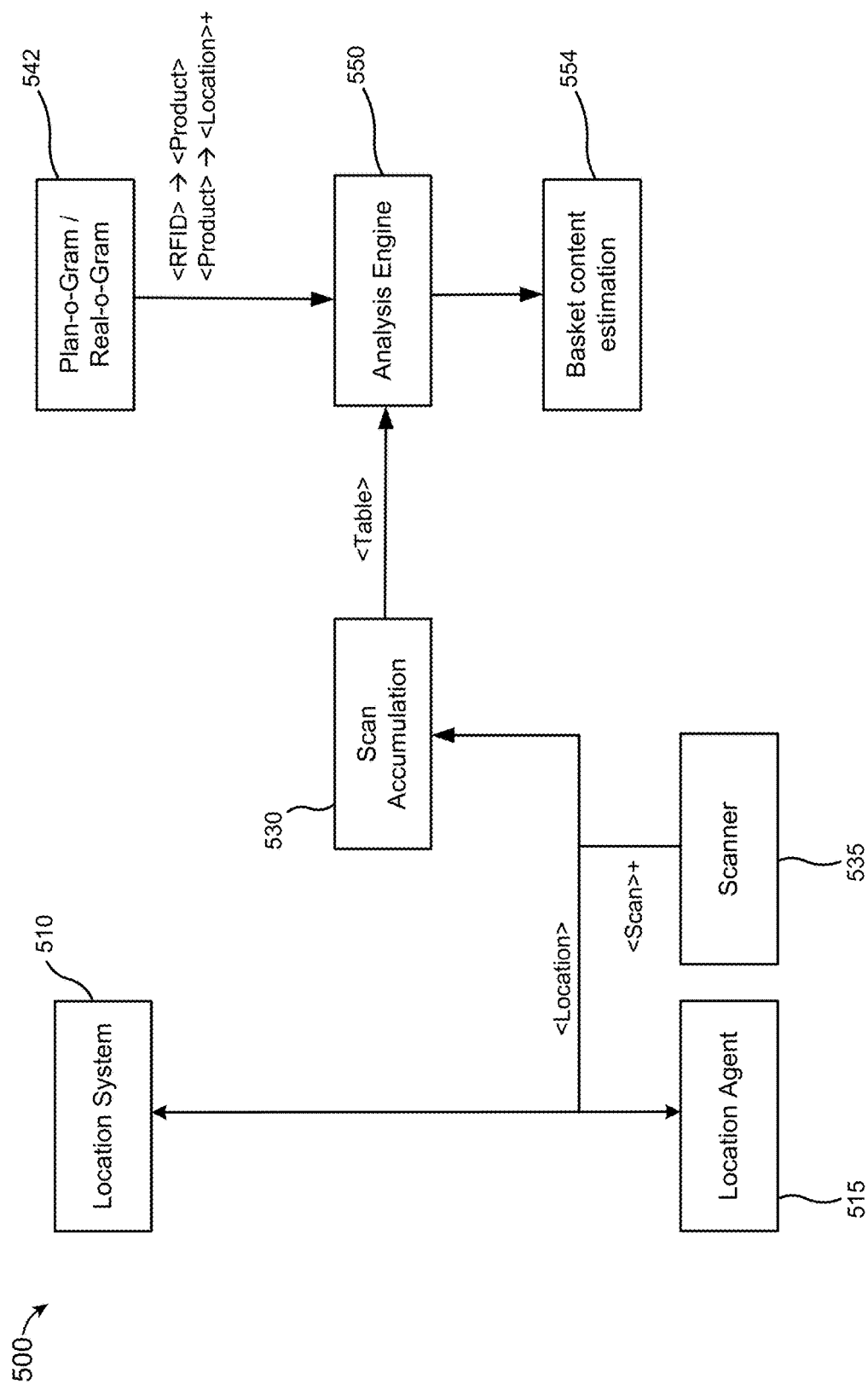
FIG. 5 is a diagram illustrating an example of an RFID system that can be used for selective RFID tag reading and/or basket content estimation, in accordance with some examples.

FIG. 5 is a diagram illustrating an example of an RFID system 500 that can be used to perform selective RFID tag reading and/or basket content estimation, in accordance with some examples. The RFID system 500 can include a location system 510 and a location agent 515, which can be configured to determine location information corresponding to an RFID energizer or reader (e.g., such as the RFID energizer 450 of FIG. 4). In some aspects, the location system 510 and location agent 515 can be included in or used to implement the location determination engine 455 of FIG. 4. In some cases, the location determination engine 455 of FIG. 4 can be the same as or similar to one or more (or both) of the location system 510 and/or the location agent 515 of FIG. 5.

The RFID system 500 can include a scanner 535 (e.g., an RFID scanner), which can be implemented as an RFID energizer (e.g., RFID reader, etc.). In some examples, the scanner 535 can be the same as or similar to one or more of the RFID reader 310 of FIG. 3, the RFID energizer 450 of FIG. 4, etc.

In some aspects, the location agent 515 can be used to determine a current location information corresponding to the scanner 535. For instance, the location system 510 can be used to trigger the location agent 515 to determine the current location information for the scanner 535. In some examples, the location agent 515 can be configured to trigger the location system 510 to determine the current location information for the scanner 535, and the location system 510 can provide the current location information to the location agent 515.

For example, the location system 510 and/or location agent 515 can determine a current location or position of the scanner 535 based on measurements of a positioning system such as GPS, GLONASS, BeiDou, Galileo, QZSS, etc. In some cases, the location system 510 and/or location agent 515 can determine a current location or position of the scanner 535 based on one or more wireless beacon signals, based on triangulation between fixed AP or ME locations within the store or retail environment, etc. In some examples, the location system 510 and/or location agent 515 can determine a current location or position of the scanner 535 using computer vision and/or image analysis to identify landmarks or other location-correlated characteristics in image data captured by the scanner 535, captured by a device associated with the scanner 535, etc. For instance, the scanner 535 can be an RFID energizer (e.g., RFID reader) implemented by or included in a smartphone or UE of the shopper (e.g., the user). One or more images can be captured by a camera of the same smartphone, UE, or other device that is used to implement the scanner 535, and can be analyzed to determine a current location of the device (and therefore a current location of the RFID scanner 535). In some cases, the location system 510 and/or location agent 515 can determine a current position of the scanner 535 based on one or more inertial measurements, such as accelerometer sensor data, gyroscopic sensor data, IMU sensor data, INS sensor data, etc. For instance, the location system 510 and/or location agent 515 may perform dead reckoning based on a starting location information and subsequent inertial measurements corresponding to movement of the scanner 535 device away from the known starting location.

In some cases, the current location information (e.g., the "<Location>" information of FIG. 5) can be obtained based on the scanner 535 transmitting an energizing signal to interrogate and/or read one or more nearby RFID tags. In some aspects, the current location information may be obtained based on the scanner 535 receiving one or more backscatter signals indicative of RFID tag identification information (e.g., RFID tag identifiers, item identifiers, etc.). In some cases, the location agent 515 and/or location system 510 can be time synchronized with the scanner 535, such that the location information (e.g., "<Location>") and the RFID tag scanning information (e.g., "<Scan>") are obtained at the same time or within a same time window within the energizing scan occasion.

In some examples, the location information (e.g., "<Location>") and the RFID tag scanning information (e.g., "<Scan>") can be accumulated using a scan accumulation engine 530. In some cases, the scan accumulation engine 530 can be associated with the RFID energizer or RFID reader device. For instance, the scanner 535 and the scan accumulation engine 530 can be included in the same device used to implement the systems and techniques described herein. In some aspects, the scanner 535 may be separate from the scan accumulation engine 530. For instance, the scanner 535 can be included on the shopper's basket and/or implemented as a handheld device, UE, smartphone, etc., carried by the shopper and maintained in proximity to the basket. The scan accumulation engine 530 can be a remote computing device, server, AP, ME, etc., associated with the store or retail environment where the shopper's collected items (e.g., within the basket contents 410 of FIG. 4) are provided. In some aspects, where the scan accumulation engine 530 is remote from the scanner 535, the scanner 535 can be configured to transmit one or more (or both) of the location information and the RFID tag scanning information wirelessly to the scan accumulation engine 530.

The scan accumulation engine 530 can be configured to analyze the location and RFID tag scanning information obtained from the location agent 515 and scanner 535, respectively, during each RFID energizing scan occasion. Based on the analysis, the scan accumulation engine 530 can update a time series table of RFID tag identifier observation information (e.g., the output "<Table>" of FIG. 5). In one illustrative example, the time series table information associated with the scan accumulation engine 530 can be the same as or similar to the time series data table 475 of FIG. 4.

In some aspects, the RFID system 500 can include an analysis engine 550 configured to analyze the time series data of the table maintained by the scan accumulation engine 530. For instance, the analysis engine 550 can analyze the time series data table information to determine a basket content estimation 554. In one illustrative example, the basket content estimation 554 can be generated by the analysis engine for each energizing scan performed by the RFID scanner 535. For instance, after the scan accumulation engine 530 updates the data table after receiving the backscatter signals corresponding to the current energizing signal transmitted by the RFID scanner 535, the analysis engine 550 can analyze the updated data table information and generate a current basket content estimation 554 (e.g., a basket content estimation 554 corresponding to the current time, the current energizing scan occasion, the current state of the data table, etc.). In some aspects, the analysis engine 550 can determine the basket content estimation 554 asynchronously with one or more energizing scans performed by the RFID scanner 535. For instance, the analysis engine 550 can determine an updated basket content estimation 554 without the RFID tag scanning information of the time series data table having been updated.

In some examples, the analysis engine 550 can be configured to analyze a data table that is the same as or similar to the time series data table 475 of FIG. 4. In some cases, the analysis engine 550 can generate a basket content estimation 554 that is indicative of a shopper's basket contents that is the same as or similar to the basket contents 410 of FIG. 4. In one illustrative example, the analysis engine 550 can determine the basket content estimation 554 based on comparing RSSI values of RFID tag scans (e.g., RSSI values of backscatter signals received from RFID tags during an energizing scan occasion) to one or more configured thresholds, where the basket content estimation 554 corresponds to RFID tags associated with backscatter signals with RSSI values greater than or equal to the configured threshold(s). In another illustrative example, the analysis engine 550 can determine the basket content estimation 554 based on the number of times that a respective RFID tag identifier within the data table maintained by scan accumulation engine 530 has been observed (e.g., as noted above with respect to FIG. 4), with the basket content estimation 554 corresponding to RFID tags that have been observed (e.g., read or scanned) a greater number of times, more frequently, at shorter intervals between successive scans or reads, etc.

In one illustrative example, one or more (or all) of the RFID observations obtained using the RFID energizer 450 of FIG. 4 and/or included within the time series data table 475 of FIG. 4 as corresponding to one or more energizing occasions of the RFID energizer 450 can be correlated with location information of the RFID energizer 450. For example, the corresponding RFID tag measurements obtained at a particular scan time $T_i$ can be correlated with location information of the RFID energizer 450 at the same time $T_i$ or a corresponding similar time to the time $T_i$.

For instance, the backscatter signals received by the RFID energizer 450 of FIG. 4 from the RFID tags of the background noise 440 and/or the basket contents 410 can be correlated to the location information determined using the location determination engine 455. The backscatter signals received by the RFID scanner 535 of FIG. 5 can be correlated to the location information determined using the location system 510 and/or the location agent 515, etc.

In some aspects, based on correlating the plurality of RFID tag observations of the time series data (e.g., the table 475 of FIG. 4, the table generated by scan accumulation engine 530 of FIG. 5, etc.) with the RFID energizer location information (e.g., the location of RFID energizer 450 of FIG. 4, the location of RFID scanner 535 of FIG. 5, etc.), the systems and techniques can determine one or more items (e.g., can determine the corresponding RFID tag identifiers of one or more items) that are expected to be present in the background noise at the particular time and location of some (or all) of the different RFID energizing scan occasions represented within the time series data.

In some aspects, the location information of the RFID energizer 450 can be a location within a store or retail environment. In some examples, the location information of the RFID energizer 450 can be relative location information, such as a position of the RFID energizer 450 or RFID energizer device within a particular aisle of a plurality of aisles of the store or retail environment, etc. As noted above, various localization techniques and/or processes can be used to determine the location information of the RFID energizer 450 at one or more energizing scan occasions, using the location determination engine 455 of FIG. 4, etc.

In some aspects, the location information of the RFID energizer 450 can be correlated (e.g., by the analysis engine 550 of FIG. 5) with product inventory mapping information and/or product distribution information corresponding to the store or retail environment within which the RFID energizer 450 of FIG. 4 is located. For instance, the product mapping information can be the same as or similar to a planogram of the store or retail environment (e.g., a store planogram), or other schematic, diagram, model, etc., indicative of the placement of retail products on shelves, aisles, etc., of the store or retail environment.

In one illustrative example, the product mapping information that is correlated with the location information of the RFID energizer 450 can be the same as or similar to the plan-o-gram (e.g., also referred to as a "planogram") or real-o-gram (e.g., also referred to as a "realogram") 542 of FIG. 5 (collectively referred to as "planogram 542" and/or "item mapping information 542"). A planogram can be obtained as a visual and/or logical representation that details how and where retail products are placed on shelves or various other display fixtures within a store or other retail environment. For example, a planogram can be indicative of information such as product arrangement, shelf space allocation, product facings, etc. Planograms can correspond to a particular store or retail environment, and an associated store layout thereof. For example, a planogram for a grocery store may indicate that Brand A of cornflakes are placed on the middle shelf of Aisle 3, on Side 1 of the aisle, at eye level and with a shelf width of two feet; Brand B of cornflakes are placed on the bottom shelf of Aisle 3, on Side 1 of the aisle, and with a shelf width of one foot; etc.

In some aspects, a planogram can be organized by product or item type, and can be indicative of one or more display or placement locations for each item type of a plurality of item types carried in inventory by the store. In some examples, the item RFID tag identifiers are unique on an item level, and the planogram information may include product identifiers that are unique on a product type level (e.g., in the example above, the planogram indicates one or more shelf locations where Brand A of cornflakes is to be located; each box of the Brand A cornflakes can be associated with a unique RFID tag identifier comprising a common Brand A cornflakes identifier (e.g., SKU) plus a unique identifier for each discrete or individual box of the Brand A cornflakes).

In some cases, the planogram or product inventory mapping information 542 of FIG. 5 can be graphical data that may be parsed and interpreted by the analysis information for comparison with the RFID energizer location information. In some examples, the planogram or product inventory mapping information 542 of FIG. 5 may be tabular data, such as a spreadsheet or csv file, a JSON or XML file represented hierarchical and/or nested relationships between products, a relational database object with tables corresponding to shelves, products, positions, etc., linked by keys, etc.

In some aspects, in examples where the product inventory mapping information 542 comprises a planogram, the product inventory mapping information can be indicative of a planned or intended location of various item types within the store or retail location (e.g., a planogram may represent the locations where various items are stocked on the shelves, but in some cases may not reflect locations of items that have been moved from their original placement(s) reflected in the planogram by customers or store employees). In some examples, the product inventory mapping information 542 can comprise a realogram, which can be indicative of an approximately real-time reporting of the particular products on particular shelves, within particular aisles, etc. For instance, a store realogram can be the same as or similar to a store planogram, where the realogram is an actual, as-found layout of products on the store's shelves and the planogram is an idealized or planned layout of the products on the store's shelves. For example, a realogram can be generated based on visual audits, photographs, sensor data, etc., of the items on the store's shelves and their respective current positions.

In one illustrative example, the time series data 475 can associate an RFID scan time $T_x$ and a corresponding location of the RFID energizer 450 $L_x$ with some (or all) of the RFID tag measurements that are stored in the table 475. In some examples, the location information of the RFID energizer 450 can be correlated with nearby products expected on the shelves, as determined based on the planogram information 542. For instance, the location information of the RFID energizer 450 can be used to identify one or more nearby expected items from the planogram 542, based on comparing the RFID energizer 450 location to the respective item locations within the planogram 542. In some aspects, the nearby or expected products identified from the planogram based on the RFID energizer 450 location can include the products located within a configured distance from the RFID energizer 450 location.

For example, the distance threshold for identifying nearby or expected products given the location $L_x$ of the RFID energizer 450 at the RFID scan time $T_x$ may be based on a read range and/or read zone of the RFID energizer 450 and the energizing signal thereof. In one illustrative example, the RFID energizer 450 may transmit an energizing signal that is expected to be received by RFID tags within 15 feet or less of the RFID energizer 450. In such examples, the nearby or expected products can include the subset of items within the planogram 542 having a corresponding shelf location that is within 15 feet or less of the location $L_x$ determined for the RFID energizer 450.

In one illustrative example, the nearby or expected products for location $L_x$ of the RFID energizer 450 can be mapped to the corresponding individual RFID tag identifiers of individual items. For instance, the RFID energizer 450 can compare a product type associated with the RFID tag identifier information of each received backscatter signal with the set of nearby or expected products for the RFID energizer location $L_x$. Based on the RFID tag identifier corresponding to an item or item type that is nearby to the RFID energizer 450 location $L_x$, the RFID observation for the RFID tag identifier can be classified as belonging to the background noise 440, or may be classified as likely belonging to the background noise 440, etc.

In one illustrative example, the RFID energizer location $L_x$ at the time of a particular RFID observation or measurement can be compared with the planogram information 542, and used to determine an expected background noise. In some aspects, an RFID observation of an RFID tag identifier that is not included in the expected background noise for the current energizer location $L_x$ can be added to the table 475 for possible inclusion in the basket contents 410 of FIG. 4 and/or the basket content estimation 554 of FIG. 5. In some aspects, the RFID observations of RFID tag identifiers that are included in the expected background noise for the current energizer location $L_x$ are not added to the table 475.

In some examples, an item can be identified as belonging to the basket contents 410 after the basket is moved to a location that is distant from the shelving location of the item (e.g., the location of the item as indicated by the planogram 542). For instance, an item added to the shopper's basket while in Aisle 1 may be identified as belonging to the expected background noise RFID tag observations for one or more (or all) of the RFID energizing scan occasions performed by the RFID energizer 450 while having a corresponding location $L_x$ that is within Aisle 1. When the shopper's basket is moved to a different aisle (e.g., the shopper moves on from Aisle 1 and begins browsing a new aisle, such as Aisle 2 or Aisle 3, etc.), the current location of the RFID energizer 450 can be compared to the planogram 542 to identify an updated set of expected background noise RFID tag identifiers (e.g., with the updated set of expected background noise RFID tag identifiers corresponding to items located within the new aisle 2 or 3, etc.). Based on the Aisle 1 product in the shopper's basket no longer being included in the expected background noise RFID tag identifiers for the current location $L_x$ of the RFID energizer 450, the systems and techniques can determine that the Aisle 1 product is included in the basket contents 410, based on one or more RFID observations of the Aisle 1 product's RFID tag identifier at a location that is not within Aisle 1.

In some aspects, the systems and techniques can determine one or more expected items within the surrounding vicinity of the RFID energizer 450. For instance, the location information can be compared to the store planogram 542 and can be used to determine one or more expected items (e.g., and corresponding RFID tag identifiers thereof) within the scanning range (e.g., read range or read zone) of the RFID energizer 450. The expected items determined from the location information of the RFID energizer 450 and store planogram 542 can be used to determine a listing of expected background noise RFID tag scans or readings (e.g., RFID observations), which may be filtered from the actual RFID tag scans or readings obtained by the RFID energizer 450 in response to the energizing signal used to interrogate and scan for nearby tags. Based on removing the RFID tag identification information of the expected background noise from the reading(s) obtained by the RFID energizer 450, RFID observations of interest (e.g., corresponding to a basket contents estimate for the basket contents 410 of FIG. 4, and/or corresponding to the basket content estimation 554 of FIG. 5) can be derived. In some examples, the expected items of the background noise can be used to determine items within the basket contents 410 based on comparing the current location of the RFID energizer 450 to the product or item location information of the store planogram 542. RFID tags that are observed in a location different from and/or inconsistent with their expected placement as indicated by the store planogram can be identified as likely belonging to the basket contents 410 of FIG. 4 and/or the basket content estimation 554 of FIG. 5.

In some aspects, the location-based correlation with the time-series data 475 and item placement information of planogram 542 can be combined with one or more of the techniques described above for determining the basket content estimation 554 using the analysis engine 550. For instance, the location-based correlation can be combined with the RSSI-based signal strength analysis. In some cases, an RFID tag can be associated with a collected item within the basket content estimation 554 of FIG. 5 based on a determination that the RFID tag identifier corresponds to a product that is not included in the expected background noise for the current RFID energizer location $L_x$ and a determination that the RFID tag identifier was included in a backscatter signal with an RSSI greater than a configured threshold value.

In another illustrative example, the location-based correlation can be combined with the time history-based analysis of multiple observations of an RFID tag identifier across multiple energizing scan occasions performed by the RFID energizer 450. For instance, an RFID tag can be associated with a collected item within the basket content estimation 554 of FIG. 5 based on a determination that the RFID tag identifier has been observed in a number of RFID observations that is greater than or equal to a first threshold value, and based on a determination that some (or all) the RFID observations were obtained during energizing scan occasions where the RFID tag identifier was not included in the expected background noise for the RFID energizer 450 location $L_x$.

In some examples, the RFID energizer 450 of FIG. 4 and/or the RFID scanner 535 of FIG. 5 can generate an energizing signal and receive one or more backscatter signals based on the energizing signal and reflected by nearby RFID tags. In some examples, the RFID energizer 450 of FIG. 4 and/or the RFID scanner 535 can be configured in a receiver-mode, where one or more RFID energizers are included in the infrastructure of the store or retail environment and may be triggered to transmit an energizing signal by the RFID scanner 535 or association information thereof (e.g., such as the current location of the RFID scanner, the elapsed time from the most recent RFID scanning occasion, etc.). In one illustrative example, one or more RFID energizers can be provided on the rail of the store shelving used to hold items for display. In some aspects, the one or more RFID energizers can be included in and/or associated with an electronic shelf label (ESL) system of the store or retail environment. For instance, the one or more RFID energizers included in the infrastructure of the store or retail environment may be the same as or similar to a BLE radio utilized for ESL management. In some examples, the one or more RFID energizers included in the infrastructure of the store or retail environment may be implemented in combination with a BLE radio utilized for ESL management of an ESL system associated with the store or retail environment.

Figure 6:
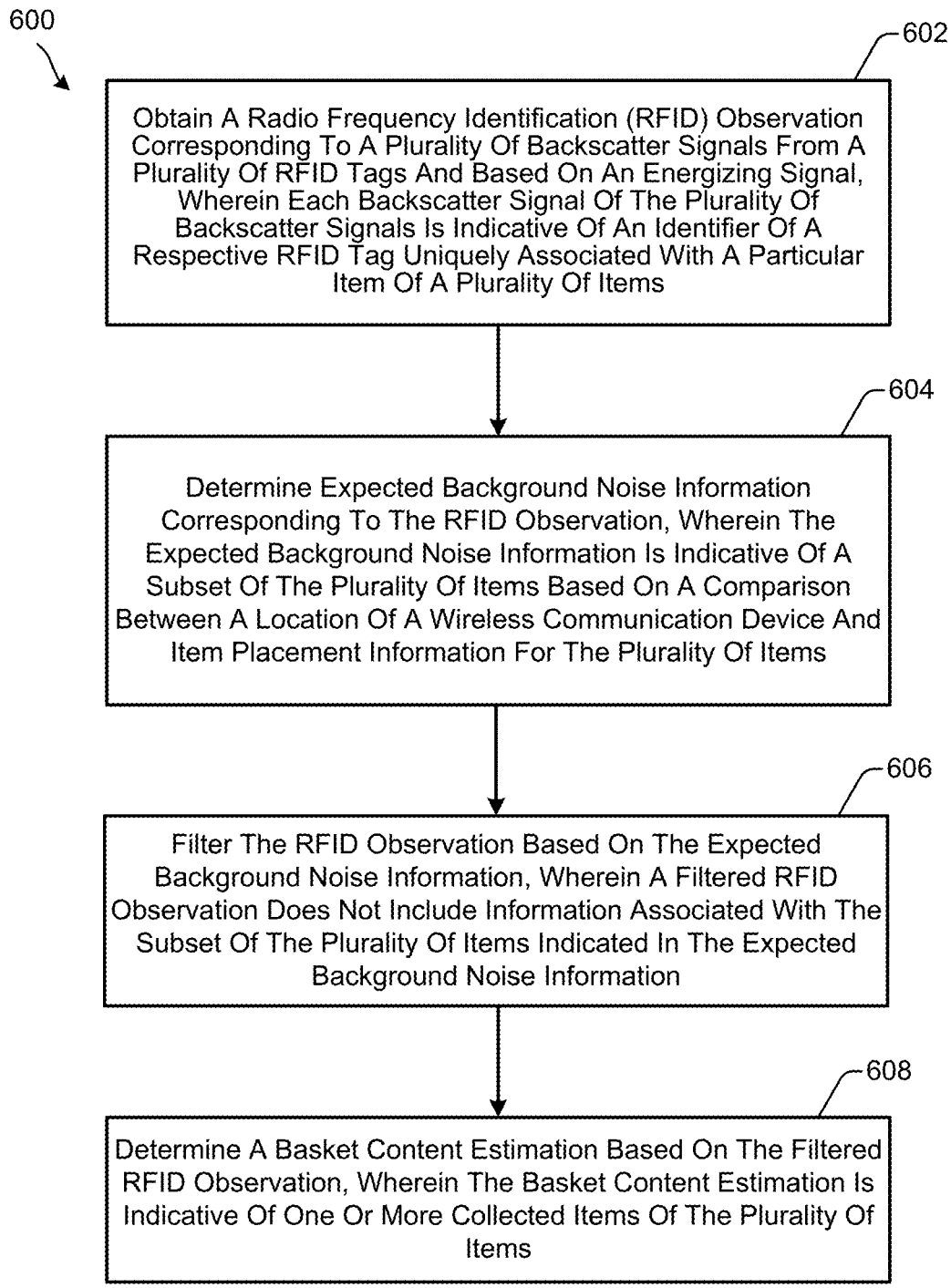
FIG. 6 is a flow chart illustrating an example of a process for wireless communications, in accordance with some examples.

FIG. 6 is a flow chart illustrating an example of a process 600 for wireless communications. The process 600 can be performed by a network entity (e.g., such as an ME) and/or a network device or by a component or system (e.g., a chipset) thereof. In some examples, the process 600 can be performed by an RFID reader and/or RFID energizer. For instance, the process 600 can be performed by a UE, smartphone, mobile computing device, user computer device, etc., that includes and/or implements an RFID reader (e.g., RFID energizer). In some examples, the process 600 can be performed by a computing device that includes an SoC configured to implement and/or including an RFID reader (e.g., RFID energizer). In some cases, the process 600 can be performed by an RFID reader (e.g., RFID energizer) included in or associated with a basket. For instance, the process 600 can be performed by an RFID reader included in or attached to a handheld shopping basket, cart, trolley, etc.

Figure 7:
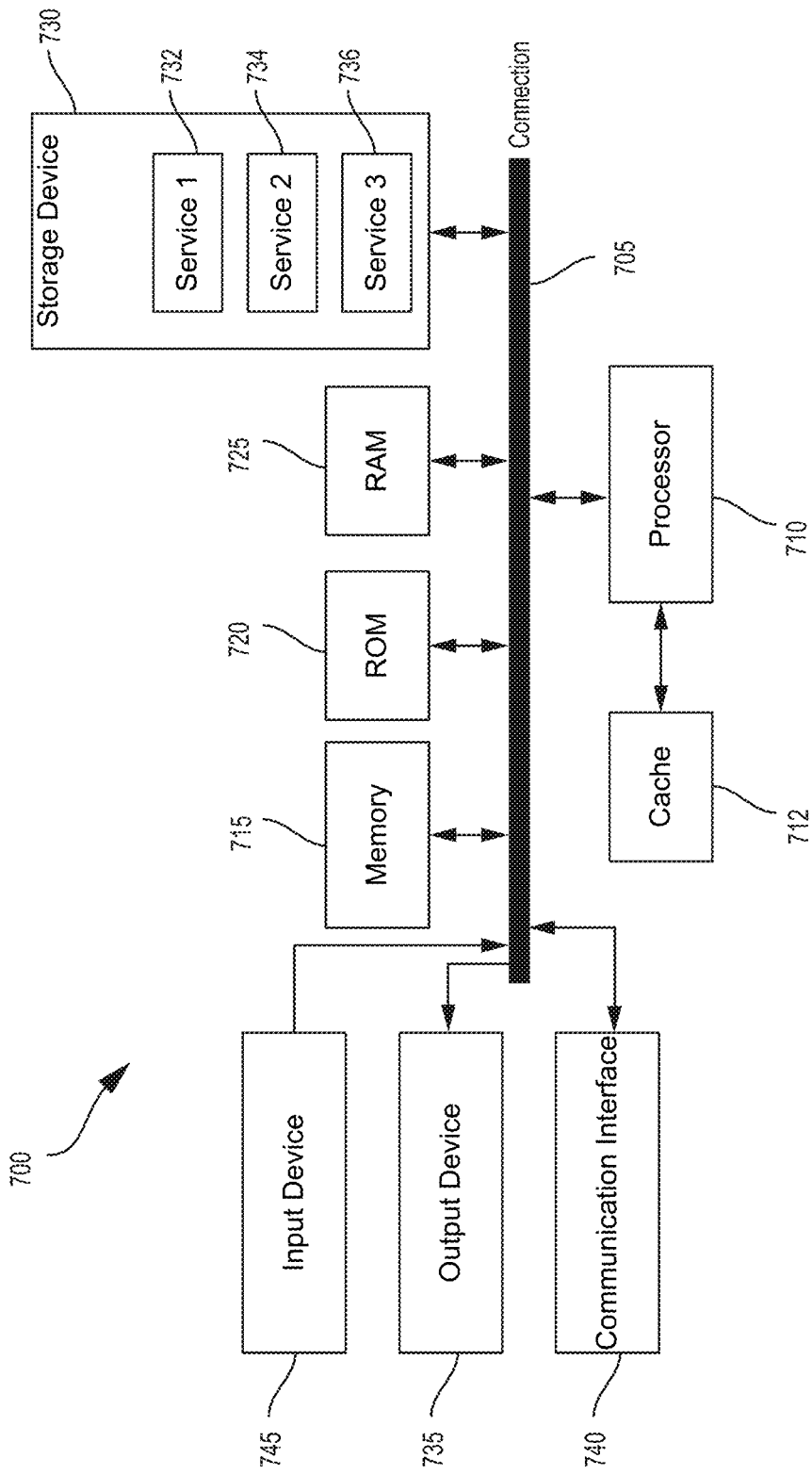
FIG. 7 is a block diagram illustrating an example of a computing system, which may be employed by the disclosed systems and techniques, in accordance with some examples.

The operations of the process 600 may be implemented as software components that are executed and run on one or more processors (e.g., processor 710 of FIG. 7 or other processor(s)). Further, the transmission and reception of signals by the wireless communications device in the process 600 may be enabled, for example, by one or more antennas and/or one or more transceivers (e.g., wireless transceiver(s)).

At block 602, the process 600 includes obtaining a Radio Frequency Identification (RFID) observation corresponding to a plurality of backscatter signals from a plurality of RFID tags and based on an energizing signal, wherein each backscatter signal of the plurality of backscatter signals is indicative of an identifier of a respective RFID tag uniquely associated with a particular item of a plurality of items.

For instance, the RFID observation can be obtained using an RFID reader that is the same as or similar to the RFID reader 310 of FIG. 3 and/or the RFID energizer 450 of FIG. 4. The plurality of backscatter signals can be received from a plurality of RFID tags that are the same as or similar to the RFID tag 350 of FIG. 3 and/or the RFID tags 442-1, 442-2, . . . , 442-m and/or 412-1, 412-2, 412-3, 412-4, . . . , 412-n of FIG. 4. In some examples, the RFID observation can be obtained using the scanner 535 of FIG. 5 as the scan accumulation 530 of FIG. 5.

In some examples, the process 600 can be performed by a wireless communication device configured as or including an RFID reader and/or RFID energizer. The wireless communication device can be associated with a basket. One or more collected items can be located within the basket, and may be the same as or similar to the basket contents 410 of FIG. 4 and/or the basket content estimation 554 of FIG. 5.

In some cases, the process 600 can include determining a respective Received Signal Strength Indicator (RSSI) value for each backscatter signal of the plurality of backscatter signals included in the RFID observation obtained by the wireless communication device (e.g., RFID reader 310 of FIG. 3, RFID energizer 450 of FIG. 4, scanner 535 of FIG. 5, etc.). The RFID observation can be filtered based on expected background noise information, such as expected background noise information associated with the background noise subset 440 of FIG. 4. The RFID observation can additionally be filtered based on a comparison between a configured threshold and the respective RSSI value for each backscatter signal within the RFID observation.

In some examples, at least a portion of the RFID observation of the plurality of backscatter signals from the plurality of RFID tags cab be stored using a time series data structure corresponding to a plurality of RFID observations. For instance, the time series data structure can be the same as or similar to the table 475 of FIG. 4 and/or a time series data structure associated with the scan accumulation 530 of FIG. 5. In some cases, the time series data structure can include respective time information (e.g., first time, last time, etc., of table 475 of FIG. 4) and respective location information (e.g., first loc, last loc, etc., of table 475 of FIG. 4) for each RFID observation of the plurality of RFID observations. In some aspects, a stored portion of the RFID observation (e.g., stored within table 475 of FIG. 4, or a time series data structure associated with scan accumulation 530 of FIG. 5, etc.) can comprise corresponding observation information for one or more backscatter signals of the plurality of backscatter signals that are not included in the expected background noise information (e.g., not included in expected background noise information associated with the background noise subset 440 of the plurality of RFID tags of FIG. 4).

At block 604, the process 600 includes determining expected background noise information corresponding to the RFID observation, wherein the expected background noise information is indicative of a subset of the plurality of items based on a comparison between a location of the wireless communication device and item placement information for the plurality of items.

For example, the expected background noise information can be indicative of RFID tag identity information associated with the background noise subset 440 of the plurality of RFID tags of FIG. 4. The location of the wireless communication device can be determined using the location determination engine 455 of FIG. 4. In some cases, the location of the wireless communication device is determined relative to item placement on shelves within a store or retail environment. For example, the item placement information for the plurality of items may be a plan-o-gram and/or a real-o-gram (e.g., such as the plan-o-gram or real-o-gram 542 of FIG. 5).

In some cases, the location determination engine 455 can be used to determine the location of the wireless communication device (e.g., the RFID energizer 450 of FIG. 4). In some cases, the location system 510 and/or location agent 515 of FIG. 5 can be used to determine the location of the scanner 535 of FIG. 5. In some examples, the location corresponds to one or more of time information of the energizing signal (e.g., the energizing signal transmitted by RFID energizer 450 of FIG. 4) or time information of a received reflection of the energizing signal (e.g., the plurality of backscatter signals of the RFID observation received by the RFID energizer 450 of FIG. 4). In some cases, the wireless communication device can transmit the energizing signal and can determine the location of the wireless communication device corresponding to a time of transmission of the energizing signal by the wireless communication device.

At block 606, the process 600 includes filtering the RFID observation based on the expected background noise information, wherein a filtered RFID observation does not include information associated with the subset of the plurality of items indicated in the expected background noise information.

For instance, the RFID observation can be filtered based on the expected background noise information corresponding to the background noise subset 440 of the plurality of RFID tags of FIG. 4. In some cases, filtering the RFID observation can be based on determining that a particular backscatter signal of the plurality of backscatter signals is associated with a respective RSSI value greater than the configured threshold, and determining that the particular backscatter signal is not included in the expected background noise information (e.g., based on the respective RSSI value being greater than the configured threshold). In some cases, the corresponding observation information for the particular backscatter signal with a respective RSSI value greater than the configured threshold can be included in the filtered RFID observation.

At block 608, the process 600 includes determining a basket content estimation based on the filtered RFID observation, wherein the basket content estimation is indicative of one or more collected items of the plurality of items.

For instance, the basket content estimation can correspond to the basket contents 410 of FIG. 4 and/or the basket content estimation 554 of FIG. 5. In some examples, the basket content estimation can be based on signal strength variation information determined between respective RSSI values of backscatter signals associated with a particular identifier of a respective RFID tag. The respective RSSI values can be stored in the table 475 of FIG. 4 and/or other time series data structure.

In some cases, a stored portion of the RFID observation comprises corresponding observation information for one or more backscatter signals of the plurality of backscatter signals that are not included in the expected background noise information. The basket content estimation can be determined based on determining a corresponding number of observations within the time series data structure (e.g., table 475 of FIG. 4) of a respective identifier of an RFID tag uniquely associated with each respective item corresponding to the filtered RFID observation. The basket content estimation can be generated to include respective items corresponding to the filtered RFID observation and having a corresponding number of observations within the time series data structure that is greater than a configured threshold number.

In some examples, the time series data structure (e.g., table 475 of FIG. 4) includes respective observation information of one or more identifiers of respective RFID tags included in multiple RFID observations of the plurality of RFID observations. In some cases, each RFID observation of the plurality of RFID observations is associated with a respective observation time, a respective energizing signal, and a respective observation location of the wireless communication device. In some cases, the RFID observation is filtered based on the expected background noise information and one or more transient RFID observations determined from the respective observation information included in the time series data structure. In some examples, the comparison between the location of the wireless communication device and the item placement information is based on the respective observation location associated with each RFID observation of the plurality of RFID observations. In some examples, the basket content estimation is further based on one or more of a most recent respective observation time of an identifier of an RFID tag uniquely associated with an item corresponding to the filtered RFID observation, or a gap between respective observation times of the identifier of an RFID tag uniquely associated with the item corresponding to the filtered RFID observation.

The network entity, network device, and/or the wireless communication device may include various components, such as one or more input devices, one or more output devices, one or more processors, one or more microprocessors, one or more microcomputers, one or more cameras, one or more sensors, one or more receivers, transmitters, and/or transceivers, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of a device configured to perform the process 600 of FIG. 6 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 7 is a block diagram illustrating an example of a computing system 700, which may be employed by the disclosed systems and techniques. In particular, FIG. 7 illustrates an example of computing system 700, which can be, for example, any computing device making up internal computing system, a remote computing system, a camera, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some aspects, computing system 700 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 700 includes at least one processing unit (CPU or processor) 710 and connection 705 that communicatively couples various system components including system memory 715, such as read-only memory (ROM) 720 and random-access memory (RAM) 725 to processor 710. Computing system 700 can include a cache 712 of high-speed memory connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700.

Computing system 700 can include communications interface 740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 740 may also include one or more range sensors (e.g., LIDAR sensors, laser range finders, RF radars, ultrasonic sensors, and infrared (IR) sensors) configured to collect data and provide measurements to processor 710, whereby processor 710 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some aspects, a hardware service that performs a particular function can include the software component stored in a computer-readable medium in connection with the necessary hardware components, such as processor 710, connection 705, output device 735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A wireless communication device, comprising: at least one memory; and at least one processor coupled to the at least one memory and configured to: obtain a Radio Frequency Identification (RFID) observation corresponding to a plurality of backscatter signals from a plurality of RFID tags and based on an energizing signal, wherein each backscatter signal of the plurality of backscatter signals is indicative of an identifier of a respective RFID tag uniquely associated with a particular item of a plurality of items; determine expected background noise information corresponding to the RFID observation, wherein the expected background noise information is indicative of a subset of the plurality of items based on a comparison between a location of the wireless communication device and item placement information for the plurality of items; filter the RFID observation based on the expected background noise information, wherein a filtered RFID observation does not include information associated with the subset of the plurality of items indicated in the expected background noise information; and determine a basket content estimation based on the filtered RFID observation, wherein the basket content estimation is indicative of one or more collected items of the plurality of items.

Aspect 2. The wireless communication device of Aspect 1, wherein the wireless communication device is associated with a basket, and wherein a the one or more collected items are located within the basket.

Aspect 3. The wireless communication device of any of Aspects 1 to 2, wherein the at least one processor is further configured to: determine a respective Received Signal Strength Indicator (RSSI) value for each backscatter signal of the plurality of backscatter signals; and filter the RFID observation based on the expected background noise information and a comparison between a configured threshold and the respective RSSI value for each backscatter signal.

Aspect 4. The wireless communication device of Aspect 3, wherein, to filter the RFID observation, the at least one processor is configured to: determine that a particular backscatter signal of the plurality of backscatter signals is associated with a respective RSSI value greater than the configured threshold; determine that the particular backscatter signal is not included in the expected background noise information; and include corresponding observation information for the particular backscatter signal in the filtered RFID observation.

Aspect 5. The wireless communication device of any of Aspects 3 to 4, wherein the basket content estimation is further based on signal strength variation information determined between respective RSSI values of backscatter signals associated with a particular identifier of a respective RFID tag.

Aspect 6. The wireless communication device of any of Aspects 1 to 5, wherein the at least one processor is further configured to: store at least a portion of the RFID observation using a time series data structure corresponding to a plurality of RFID observations, wherein the time series data structure includes respective time information and respective location information for each RFID observation of the plurality of RFID observations.

Aspect 7. The wireless communication device of Aspect 6, wherein a stored portion of the RFID observation comprises corresponding observation information for one or more backscatter signals of the plurality of backscatter signals that are not included in the expected background noise information.

Aspect 8. The wireless communication device of Aspect 7, wherein, to determine the basket content estimation, the at least one processor is configured to: determine a corresponding number of observations within the time series data structure of a respective identifier of an RFID tag uniquely associated with each respective item corresponding to the filtered RFID observation; and generate the basket content estimation to include respective items corresponding to the filtered RFID observation and having a corresponding number of observations within the time series data structure that is greater than a configured threshold number.

Aspect 9. The wireless communication device of any of Aspects 7 to 8, wherein the time series data structure includes respective observation information of one or more identifiers of respective RFID tags included in multiple RFID observations of the plurality of RFID observations.

Aspect 10. The wireless communication device of Aspect 9, wherein each RFID observation of the plurality of RFID observations is associated with a respective observation time, a respective energizing signal, and a respective observation location of the wireless communication device.

Aspect 11. The wireless communication device of Aspect 10, wherein the RFID observation is filtered based on the expected background noise information and one or more transient RFID observations determined from the respective observation information included in the time series data structure.

Aspect 12. The wireless communication device of any of Aspects 10 to 11, wherein the comparison between the location of the wireless communication device and the item placement information is based on the respective observation location associated with each RFID observation of the plurality of RFID observations.

Aspect 13. The wireless communication device of any of Aspects 10 to 12, wherein the basket content estimation is further based on one or more of a most recent respective observation time of an identifier of an RFID tag uniquely associated with an item corresponding to the filtered RFID observation, or a gap between respective observation times of the identifier of the RFID tag uniquely associated with the item corresponding to the filtered RFID observation.

Aspect 14. The wireless communication device of any of Aspects 1 to 13, wherein the at least one processor is further configured to: determine the location of the wireless communication device, wherein the location corresponds to one or more of time information of the energizing signal or time information of a received reflection of the energizing signal.

Aspect 15. The wireless communication device of Aspect 14, wherein the at least one processor is further configured to: transmit the energizing signal; and determine the location of the wireless communication device corresponding to a time of transmission of the energizing signal by the wireless communication device.

Aspect 16. A method for wireless communication, the method comprising: obtaining a Radio Frequency Identification (RFID) observation corresponding to a plurality of backscatter signals from a plurality of RFID tags and based on an energizing signal, wherein each backscatter signal of the plurality of backscatter signals is indicative of an identifier of a respective RFID tag uniquely associated with a particular item of a plurality of items; determining expected background noise information corresponding to the RFID observation, wherein the expected background noise information is indicative of a subset of the plurality of items based on a comparison between a location of a wireless communication device and item placement information for the plurality of items; filtering the RFID observation based on the expected background noise information, wherein a filtered RFID observation does not include information associated with the subset of the plurality of items indicated in the expected background noise information; and determining a basket content estimation based on the filtered RFID observation, wherein the basket content estimation is indicative of one or more collected items of the plurality of items.

Aspect 17. The method of Aspect 16, wherein the wireless communication device is associated with a basket, and wherein a the one or more collected items are located within the basket.

Aspect 18. The method of any of Aspects 16 to 17, further comprising: determining a respective Received Signal Strength Indicator (RSSI) value for each backscatter signal of the plurality of backscatter signals; and filtering the RFID observation based on the expected background noise information and a comparison between a configured threshold and the respective RSSI value for each backscatter signal.

Aspect 19. The method of Aspect 18, wherein filtering the RFID observation comprises: determining that a particular backscatter signal of the plurality of backscatter signals is associated with a respective RSSI value greater than the configured threshold; determining that the particular backscatter signal is not included in the expected background noise information; and including corresponding observation information for the particular backscatter signal in the filtered RFID observation.

Aspect 20. The method of any of Aspects 18 to 19, wherein the basket content estimation is further based on signal strength variation information determined between respective RSSI values of backscatter signals associated with a particular identifier of a respective RFID tag.

Aspect 21. The method of any of Aspects 16 to 20, further comprising: storing at least a portion of the RFID observation using a time series data structure corresponding to a plurality of RFID observations, wherein the time series data structure includes respective time information and respective location information for each RFID observation of the plurality of RFID observations.

Aspect 22. The method of Aspect 21, wherein a stored portion of the RFID observation comprises corresponding observation information for one or more backscatter signals of the plurality of backscatter signals that are not included in the expected background noise information.

Aspect 23. The method of Aspect 22, wherein determining the basket content estimation comprises: determining a corresponding number of observations within the time series data structure of a respective identifier of an RFID tag uniquely associated with each respective item corresponding to the filtered RFID observation; and generating the basket content estimation to include respective items corresponding to the filtered RFID observation and having a corresponding number of observations within the time series data structure that is greater than a configured threshold number.

Aspect 24. The method of any of Aspects 22 to 23, wherein the time series data structure includes respective observation information of one or more identifiers of respective RFID tags included in multiple RFID observations of the plurality of RFID observations.

Aspect 25. The method of Aspect 24, wherein each RFID observation of the plurality of RFID observations is associated with a respective observation time, a respective energizing signal, and a respective observation location of the wireless communication device.

Aspect 26. The method of Aspect 25, wherein the RFID observation is filtered based on the expected background noise information and one or more transient RFID observations determined from the respective observation information included in the time series data structure.

Aspect 27. The method of any of Aspects 25 to 26, wherein the comparison between the location of the wireless communication device and the item placement information is based on the respective observation location associated with each RFID observation of the plurality of RFID observations.

Aspect 28. The method of any of Aspects 25 to 27, wherein the basket content estimation is further based on one or more of a most recent respective observation time of an identifier of an RFID tag uniquely associated with an item corresponding to the filtered RFID observation, or a gap between respective observation times of the identifier of the RFID tag uniquely associated with the item corresponding to the filtered RFID observation.

Aspect 29. The method of any of Aspects 16 to 28, further comprising: determining the location of the wireless communication device, wherein the location corresponds to one or more of time information of the energizing signal or time information of a received reflection of the energizing signal.

Aspect 30. The method of Aspect 29, further comprising: transmitting the energizing signal; and determining the location of the wireless communication device corresponding to a time of transmission of the energizing signal by the wireless communication device.

Aspect 31. A non-transitory computer-readable storage medium comprising instructions stored thereon which, when executed by at least one processor, causes the at least one processor to perform operations according to any of Aspects 16 to 30.

Aspect 32. An apparatus for wireless communication comprising one or more means for performing operations according to any of Aspects 16 to 30.

What is claimed is:

1. A wireless communication device, comprising:
at least one memory; and
at least one processor coupled to the at least one memory and configured to:
obtain a Radio Frequency Identification (RFID) observation corresponding to a plurality of backscatter signals from a plurality of RFID tags and based on an energizing signal, wherein each backscatter signal of the plurality of backscatter signals is indicative of an identifier of a respective RFID tag uniquely associated with a particular item of a plurality of items;
determine expected background noise information corresponding to the RFID observation, wherein the expected background noise information is indicative of a subset of the plurality of items based on a comparison between a location of the wireless communication device and item placement information for the plurality of items;
filter the RFID observation based on the expected background noise information, wherein a filtered RFID observation does not include information associated with the subset of the plurality of items indicated in the expected background noise information; and
determine a basket content estimation based on the filtered RFID observation, wherein the basket content estimation is indicative of one or more collected items of the plurality of items.

2. The wireless communication device of claim 1, wherein the wireless communication device is associated with a basket, and wherein the one or more collected items are located within the basket.

3. The wireless communication device of claim 1, wherein the at least one processor is further configured to:
determine a respective Received Signal Strength Indicator (RSSI) value for each backscatter signal of the plurality of backscatter signals; and
filter the RFID observation based on the expected background noise information and a comparison between a configured threshold and the respective RSSI value for each backscatter signal.

4. The wireless communication device of claim 3, wherein, to filter the RFID observation, the at least one processor is configured to:
determine that a particular backscatter signal of the plurality of backscatter signals is associated with a respective RSSI value greater than the configured threshold;
determine that the particular backscatter signal is not included in the expected background noise information; and
include corresponding observation information for the particular backscatter signal in the filtered RFID observation.

5. The wireless communication device of claim 3, wherein the basket content estimation is further based on signal strength variation information determined between respective RSSI values of backscatter signals associated with a particular identifier of a respective RFID tag.

6. The wireless communication device of claim 1, wherein the at least one processor is further configured to:
store at least a portion of the RFID observation using a time series data structure corresponding to a plurality of RFID observations, wherein the time series data structure includes respective time information and respective location information for each RFID observation of the plurality of RFID observations.

7. The wireless communication device of claim 6, wherein a stored portion of the RFID observation comprises corresponding observation information for one or more backscatter signals of the plurality of backscatter signals that are not included in the expected background noise information.

8. The wireless communication device of claim 7, wherein, to determine the basket content estimation, the at least one processor is configured to:
determine a corresponding number of observations within the time series data structure of a respective identifier of an RFID tag uniquely associated with each respective item corresponding to the filtered RFID observation; and
generate the basket content estimation to include respective items corresponding to the filtered RFID observation and having a corresponding number of observations within the time series data structure that is greater than a configured threshold number.

9. The wireless communication device of claim 7, wherein the time series data structure includes respective observation information of one or more identifiers of respective RFID tags included in multiple RFID observations of the plurality of RFID observations.

10. The wireless communication device of claim 9, wherein each RFID observation of the plurality of RFID observations is associated with a respective observation time, a respective energizing signal, and a respective observation location of the wireless communication device.

11. The wireless communication device of claim 10, wherein the RFID observation is filtered based on the expected background noise information and one or more transient RFID observations determined from the respective observation information included in the time series data structure.

12. The wireless communication device of claim 10, wherein the comparison between the location of the wireless communication device and the item placement information is based on the respective observation location associated with each RFID observation of the plurality of RFID observations.

13. The wireless communication device of claim 10, wherein the basket content estimation is further based on one or more of a most recent respective observation time of an identifier of an RFID tag uniquely associated with an item corresponding to the filtered RFID observation, or a gap between respective observation times of the identifier of the RFID tag uniquely associated with the item corresponding to the filtered RFID observation.

14. The wireless communication device of claim 1, wherein the at least one processor is further configured to:
determine the location of the wireless communication device, wherein the location corresponds to one or more of time information of the energizing signal or time information of a received reflection of the energizing signal.

15. The wireless communication device of claim 14, wherein the at least one processor is further configured to:
transmit the energizing signal; and
determine the location of the wireless communication device corresponding to a time of transmission of the energizing signal by the wireless communication device.

16. A method for wireless communication, the method comprising:
obtaining a Radio Frequency Identification (RFID) observation corresponding to a plurality of backscatter signals from a plurality of RFID tags and based on an energizing signal, wherein each backscatter signal of the plurality of backscatter signals is indicative of an identifier of a respective RFID tag uniquely associated with a particular item of a plurality of items;
determining expected background noise information corresponding to the RFID observation, wherein the expected background noise information is indicative of a subset of the plurality of items based on a comparison between a location of a wireless communication device and item placement information for the plurality of items;
filtering the RFID observation based on the expected background noise information, wherein a filtered RFID observation does not include information associated with the subset of the plurality of items indicated in the expected background noise information; and
determining a basket content estimation based on the filtered RFID observation, wherein the basket content estimation is indicative of one or more collected items of the plurality of items.

17. The method of claim 16, wherein the wireless communication device is associated with a basket, and wherein the one or more collected items are located within the basket.

18. The method of claim 16, further comprising:
determining a respective Received Signal Strength Indicator (RSSI) value for each backscatter signal of the plurality of backscatter signals; and
filtering the RFID observation based on the expected background noise information and a comparison between a configured threshold and the respective RSSI value for each backscatter signal.

19. The method of claim 18, wherein filtering the RFID observation comprises:
determining that a particular backscatter signal of the plurality of backscatter signals is associated with a respective RSSI value greater than the configured threshold;
determining that the particular backscatter signal is not included in the expected background noise information; and
including corresponding observation information for the particular backscatter signal in the filtered RFID observation.

20. The method of claim 18, wherein the basket content estimation is further based on signal strength variation information determined between respective RSSI values of backscatter signals associated with a particular identifier of a respective RFID tag.

21. The method of claim 16, further comprising:
storing at least a portion of the RFID observation using a time series data structure corresponding to a plurality of RFID observations, wherein the time series data structure includes respective time information and respective location information for each RFID observation of the plurality of RFID observations.

22. The method of claim 21, wherein a stored portion of the RFID observation comprises corresponding observation information for one or more backscatter signals of the plurality of backscatter signals that are not included in the expected background noise information.

23. The method of claim 22, wherein determining the basket content estimation comprises:
determining a corresponding number of observations within the time series data structure of a respective identifier of an RFID tag uniquely associated with each respective item corresponding to the filtered RFID observation; and
generating the basket content estimation to include respective items corresponding to the filtered RFID observation and having a corresponding number of observations within the time series data structure that is greater than a configured threshold number.

24. The method of claim 22, wherein the time series data structure includes respective observation information of one or more identifiers of respective RFID tags included in multiple RFID observations of the plurality of RFID observations.

25. The method of claim 24, wherein each RFID observation of the plurality of RFID observations is associated with a respective observation time, a respective energizing signal, and a respective observation location of the wireless communication device.

26. The method of claim 25, wherein the RFID observation is filtered based on the expected background noise information and one or more transient RFID observations determined from the respective observation information included in the time series data structure.

27. The method of claim 25, wherein the comparison between the location of the wireless communication device and the item placement information is based on the respective observation location associated with each RFID observation of the plurality of RFID observations.

28. The method of claim 25, wherein the basket content estimation is further based on one or more of a most recent respective observation time of an identifier of an RFID tag uniquely associated with an item corresponding to the filtered RFID observation, or a gap between respective observation times of the identifier of the RFID tag uniquely associated with the item corresponding to the filtered RFID observation.

29. The method of claim 16, further comprising:
determining the location of the wireless communication device, wherein the location corresponds to one or more of time information of the energizing signal or time information of a received reflection of the energizing signal.

30. The method of claim 29, further comprising:
transmitting the energizing signal; and
determining the location of the wireless communication device corresponding to a time of transmission of the energizing signal by the wireless communication device.

\* \* \* \* \*